(12) United States Patent
Remond

(10) Patent No.: US 12,038,957 B1
(45) Date of Patent: Jul. 16, 2024

(54) APPARATUS AND METHOD FOR AN ONLINE SERVICE PROVIDER

(71) Applicant: Guidr, LLC, Naples, FL (US)

(72) Inventor: Guy Remond, Sandbach (GB)

(73) Assignee: Guidr, LLC, Naples, FL (US)

( * ) Notice: Subject to any disclaimer, the term of this patent is extended or adjusted under 35 U.S.C. 154(b) by 0 days.

(21) Appl. No.: 18/205,135

(22) Filed: Jun. 2, 2023

(51) Int. Cl.
  *G06F 16/00* (2019.01)
  *G06F 16/332* (2019.01)
  *G06F 16/335* (2019.01)

(52) U.S. Cl.
  CPC ........ *G06F 16/335* (2019.01); *G06F 16/3329* (2019.01)

(58) Field of Classification Search
  CPC ............................ G06F 16/335; G06F 16/3329
  USPC ........................................................ 707/722
  See application file for complete search history.

(56) References Cited

U.S. PATENT DOCUMENTS

| | | | | |
|---|---|---|---|---|
| 7,813,822 | B1 * | 10/2010 | Hoffberg | H04N 7/163 381/73.1 |
| 8,676,663 | B1 | 3/2014 | Robinson | |
| 10,467,527 | B1 * | 11/2019 | Margaglia | G06F 16/28 |
| 11,270,250 | B2 | 3/2022 | Lin | |
| 11,620,473 | B1 * | 4/2023 | Zhang | G06F 18/213 382/159 |
| 2006/0063156 | A1 * | 3/2006 | Willman | A61P 35/02 435/325 |
| 2009/0322477 | A1 * | 12/2009 | Celorio | G07C 9/257 340/5.82 |
| 2018/0374572 | A1 | 12/2018 | Ackerman | |
| 2019/0018968 | A1 * | 1/2019 | Ronca | G06F 21/577 |
| 2022/0156754 | A1 * | 5/2022 | MacArthur | G06Q 30/018 |
| 2022/0172294 | A1 * | 6/2022 | Irwin | G06Q 10/10 |

FOREIGN PATENT DOCUMENTS

TW    202238492 A  * 10/2022

OTHER PUBLICATIONS

Lawfirm success group; "The digitization of Law with David Zumpano and GUy Remond"; The wayback machine; May 30, 2022; 13 pages.*

Van Smith; "The Medicaid Minefield"; The wayback machine; Sep. 29, 2020, 13 pages.*

\* cited by examiner

*Primary Examiner* — Monica M Pyo
(74) *Attorney, Agent, or Firm* — Caldwell Intellectual Property Law

(57) ABSTRACT

An apparatus and method for online service providing are disclosed. The apparatus includes a memory communicatively connected to at least a processor, wherein the memory contains instructions configuring the at least a processor to obtain provider data, wherein the provider data includes a provider address, receive user data, wherein the user data includes a user address, determine relation data as a function of the provider data and the user data, wherein the relation data includes an address relation, generate a provider map as a function of the provider data, wherein the provider map includes a relation function, wherein the relation function is configured to display the relation data and a filter function, wherein the filter function is configured to display filtered relation data, transmit the provider map to a user device and transmit the provider map to a provider device.

20 Claims, 9 Drawing Sheets

APPARATUS AND METHOD FOR AN ONLINE SERVICE PROVIDER

FIELD OF THE INVENTION

The present invention generally relates to the field of service providing. In particular, the present invention is directed to apparatus and method for online service providing.

BACKGROUND

Service providers often struggle to find and attract the right customers, while customers may have difficulty finding the right service provider for their needs. Existing technologies that tries to solve these problems are complicated, time-consuming and inefficient.

SUMMARY OF THE DISCLOSURE

In an aspect, an apparatus for online service providing is disclosed. The apparatus includes at least a processor and a memory communicatively connected to the at least a processor, wherein the memory contains instructions configuring the at least a processor to obtain provider data, wherein the provider data includes a provider address, receive user data, wherein the user data includes a user address, determine relation data as a function of the provider data and the user data, wherein the relation data includes an address relation, generate a provider map as a function of the provider data, wherein the provider map includes a relation function, wherein the relation function is configured to display the relation data and a filter function, wherein the filter function is configured to display filtered relation data, transmit the provider map to a user device and transmit the provider map to a provider device.

In another aspect, a method for online service providing is disclosed. The method includes obtaining, using at least a processor, provider data, wherein the provider data includes a provider address, receiving, using the at least a processor, user data, wherein the user data includes a user address, determining, using the at least a processor, relation data as a function of the provider data and the user data, wherein the relation data includes an address relation, generating, using the at least a processor, a provider map as a function of the provider data, wherein the provider map includes a relation function, wherein the relation function is configured to display the relation data and a filter function, wherein the filter function is configured to display filtered relation data, transmitting, using the at least a processor, the provider map to a user device, transmitting, using the at least a processor, the provider map to a provider device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
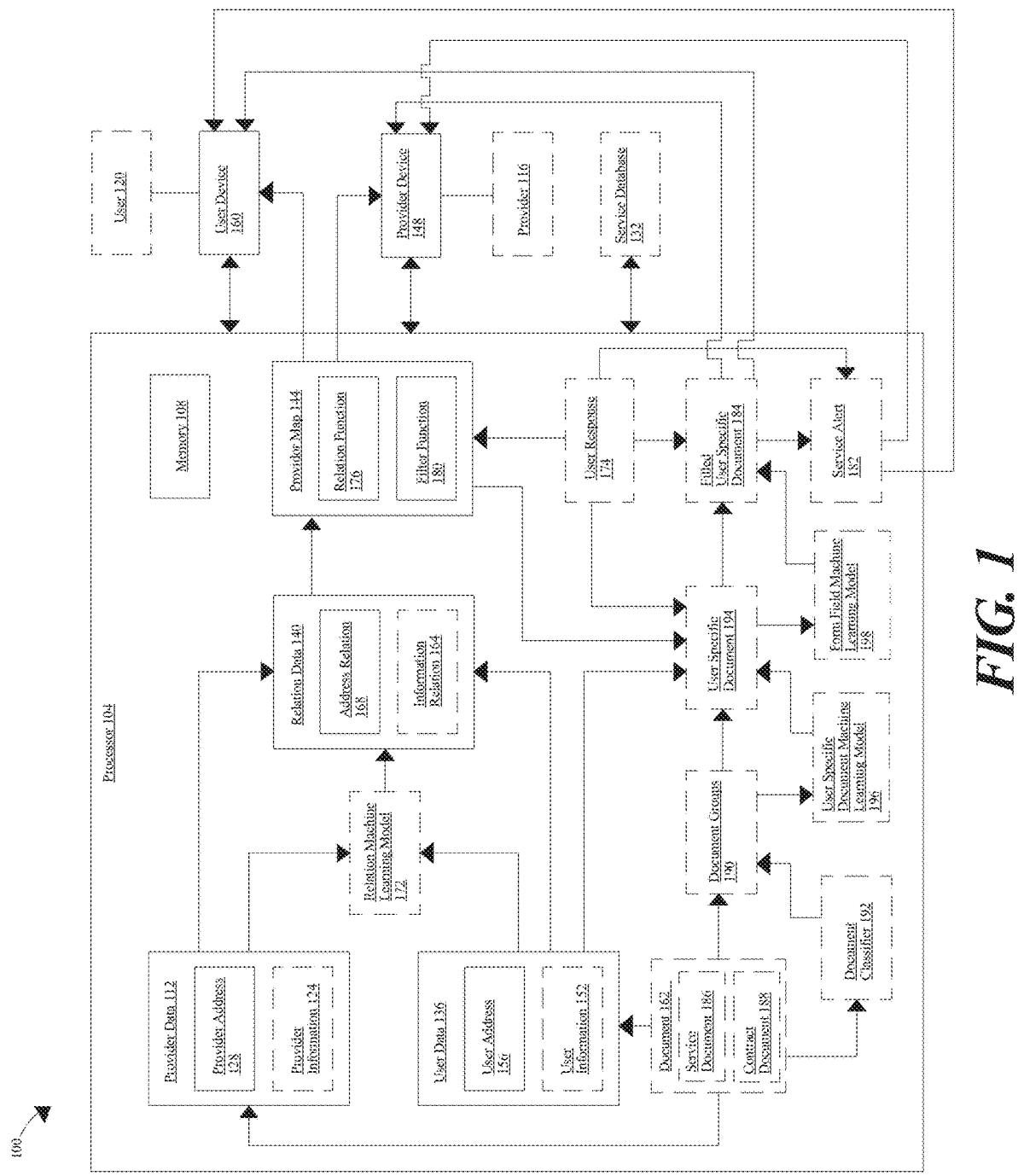
FIG. 1 is an illustration of a block diagram of an exemplary apparatus for online service providing.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for online service providing. The apparatus includes at least a processor and a memory communicatively connected to the at least a processor, wherein the memory contains instructions configuring the at least a processor to obtain provider data, wherein the provider data includes a provider address, receive user data, wherein the user data includes a user address, determine relation data as a function of the provider data and the user data, wherein the relation data includes an address relation, generate a provider map as a function of the provider data, wherein the provider map includes a relation function, wherein the relation function is configured to display the relation data and a filter function, wherein the filter function is configured to display the filtered relation data, display the provider map on a user device and display the provider map on a provider device. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grostl hash function, the HAS-160 hash function, the JH hash function, the RadioGatnn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof Zero-knowledge proof may include, without limitation, bulletproofs. Zero-knowledge proof may include a homomorphic public-key cryptography (hPKC)-based proof Zero-knowledge proof may include a discrete logarithmic problem (DLP) proof. Zero-knowledge proof may include a secure multi-party computation (MPC) proof Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, a block diagram of an exemplary apparatus 100 for online service providing is illustrated. The apparatus 100 includes at least a processor 104. The at least a processor 104 may include, without limitation, any processor described in this disclosure. The at least a processor 104 may be included in a computing device. The at least a processor 104 may include any computing device as described in this disclosure, including without limitation a microcontroller, microprocessor, digital signal processor (DSP) and/or system on a chip (SoC) as described in this disclosure. The at least a processor 104 may include, be included in, and/or communicate with a mobile device such as a mobile telephone or smartphone. The at least a processor 104 may include a single computing device operating independently, or may include two or more computing device operating in concert, in parallel, sequentially or the like; two or more computing devices may be included together in a single computing device or in two or more computing devices. The at least a processor 104 may interface or communicate with one or more additional devices as described below in further detail via a network interface device. Network interface device may be utilized for connecting the at least a processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The at least a processor 104 may include but is not limited to, for example, a computing device or cluster of computing devices in a first location and a second computing device or cluster of computing devices in a second location. The at least a processor 104 may include one or more computing devices dedicated to data storage, security, distribution of traffic for load balancing, and the like. The at least a processor 104 may distribute one or more computing tasks as described below across a plurality of computing devices of computing device, which may operate in parallel, in series, redundantly, or in any other manner used for distribution of tasks or memory between computing devices. The at least a processor 104 may be implemented, as a non-limiting example, using a "shared nothing" architecture.

With continued reference to FIG. 1, at least a processor 104 may be designed and/or configured to perform any method, method step, or sequence of method steps in any embodiment described in this disclosure, in any order and with any degree of repetition. For instance, the at least a processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The at least a processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 108 communicatively connected to at least a processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring at least a processor 104 to obtain provider data 112. For the purposes of this disclosure, "provider data" is data related to a plurality of providers or the providers' service. For the purposes of this disclosure, a "provider" is an individual, group, company, or any entity that provides a service to a user. As a non-limiting example, the provider 116 may include an information technology (IT) service provider, telecommunication service provider, healthcare service provider, financial service provider, transportation service provider, legal service provider, educational service provider, hospitality service provider, consulting service provider, cleaning service provider, personal care provider, hone repair service provider, advertising service provider, event planning service provider, catering service provider, fitness service provider, pet care service provider, photography and videography service provider, translation service provider, real estate service provider, occupational service provider, and any service provider thereof. In some embodiments, providers 116 may be licensed in certain areas of service or jurisdictions. In some embodiments, the plurality of the providers 116 may include one or more providers 116 providing the same type of service. In some embodiments, the plurality of the providers 116 may include one or more providers 116 providing different types of service. In some embodiments, a first provider 116 that provides a first type of service may interact with a second provider that provides a second type of service. In some embodiments, jurisdictions may include, as non-limiting examples, courts, states, countries, agencies, and the like.

With continued reference to FIG. 1, for the purposes of this disclosure, a "user" is an individual, group, company, or any entity that needs or uses a service. In some embodiments, the user 120 may include a past user, current user, prospective user, and the like. For the purposes of this disclosure, a "service" is an act or performance provided by a provider to a user. As a non-limiting example, the service may include legal services, healthcare services, financial services, consulting services, transportation services, educational services, entertainment services, travel services, cleaning services, maintenance services, fitness services, pet care services, real estate services, occupational services, and any services thereof. In some embodiments, each of the service may include sub-services that may be more specific than general services. As a non-limiting example, the legal services may include litigation, transactional services, estate planning, intellectual property services, corporate law services, immigration services, and the like. The example above merely shows exemplary sub-services for legal services, and various sub-services for other services may be appreciated by persons skilled in the art upon reviewing the entirety of this disclosure.

With continued reference to FIG. 1, in some embodiments, provider data 112 may include provider information 124. For the purposes of this disclosure, "provider information" is information related to each of a plurality of providers and the providers' service. As a non-limiting example, the provider information 124 may include a name, gender, contact information, related entity, service experience, service area, service plan, service history, referral, review, service availability, service cost, specialty, education, certification of each of the plurality of providers 116, and the like. As another non-limiting example, the provider information 124 may include an image of each of the plurality of providers 116. As another non-limiting example, the provider information 124 may include Uniform Resource Locators (URLs) of each of the plurality of providers' 116 website. In some embodiments, a user 120 may click the URLs and get access to the provider 116's service website. As another non-limiting example, the provider information may include financial information of each of the plurality of providers 116. In some embodiments, the financial information of the provider 116 may be used for a trust verification. The trust verification disclosed herein is further described below.

With continued reference to FIG. 1, in some embodiments, provider data 112 includes a provider address 128. For the purpose of this disclosure, a "provider address" is information related to a location of a provider. As a non-limiting example, the provider address 128 may include a name and number of street, a name and/or number of a building, city, state, country and zone improvement plan (zip) code. For example, and without limitation, the provider address of the Empire State Building may include 20 W 34th St., New York, NY 10001. As another non-limiting example, the provider address 128 may include a global positioning system (GPS) coordinate. For the purposes of this disclosure, a "global positioning system coordinate" is a unique identifier of a precise geographic location on the earth. "Coordinates," in this context, are points of intersection in a grid system. As a non-limiting example, GPS coordinates may include the combination of latitude and longitude. Lines of latitude coordinates measure degrees of distance north and south from the equator, which is 0 degrees. The north pole and south pole are at 90 degrees in either direction. The prime meridian, located in Greenwich, UK, is 0 degrees longitude, and the lines of longitude coordinates are measured according to 90 degrees east and west from that point. In an embodiment, the GPS coordinate may include alphanumeric characters. As a non-limiting example, alphanumeric characters of the GPS coordinate of the Empire State Building in New York City may include N40° 44.9064', W073° 59.0735'. In another embodiment, alternatively, the GPS coordinate may include a numeric format. As a non-limiting example, a numeric format of the GPS coordinate of the Empire State Building in New York City may include 40.748440, −73.984559. In the numeric format, the minus sign before the second number indicates that the location is west of the prime meridian; a minus sign in front of the first number would indicate degrees south of the equator.

With continued reference to FIG. 1, in some embodiments, provider data 112 may be obtained from a service database 132. In some embodiments, an apparatus 100 may include a service database 132. As used in this disclosure, "service database" is a data structure configured to store data associated with a provider or user. As a non-limiting example, the service database 132 may store provider data 112, user data 136, relation data 140, provider map 144, and the like. In one or more embodiments, the service database 132 may include inputted or calculated information and datum related to a provider 116 and a user 120. In some embodiments, a datum history may be stored in a service database 132. As a non-limiting example, the datum history may include real-time and/or previous inputted data related to the provider 116 and the user 120, such as but not limited to the provider data 112, user data 136, relation data 140, provider map 144, and the like. As a non-limiting example, the service database 132 may include instructions from a user 120, who may be an expert user, a past user in embodiments disclosed herein, or the like, where the instructions may include examples of the data related to the provider 116 and the user 120.

With continued reference to FIG. 1, in some embodiments, at least a processor 104 may be communicatively connected with a service database 132. For example, and without limitation, in some cases, the service database 132 may be local to the at least a processor 104. In another example, and without limitation, the service database 132 may be remote to the at least a processor 104 and communicative with the at least a processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure at least a processor 104 connect directly, dynamically, and non-hierarchically to as many other computing devices as possible. A "network topology" as used in this disclosure is an arrangement of elements of a communication network. The network may use an immutable sequential listing to securely store the service database 132. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, a service database 132 may include keywords. As used in this disclosure, a "keyword" is an element of word or syntax used to identify and/or match elements to each other. For example, without limitation, the keyword may include "02210" in the instance that a user 120 is looking for a zip code. In another non-limiting example, the keyword may include "a name of an attorney" in an example where the user 120 is looking for a specific attorney. In another non-limiting example, the keyword may include "amount of money" in an example where the user 120 is looking for a specific amount of money.

With continued reference to FIG. 1, in some embodiments, a service database 132 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, provider data 112 may be obtained from a provider device 148. For the purposes of this disclosure, a "provider device" is any device a provider may use to input data. As a non-limiting example, a provider 116 may input provider data 112 such as but not limited to provider information 124, provider address 128, and the like using the provider data 112. For example, and without limitation, a provider 116 may input service prices, service area, provider address 128, service discount, and the like. For the purposes of this disclosure, "service discount" is a reduction in the price or cost of a service that is offered by a provider to its customers (e.g. user). In some embodiments, the service discount may include percentage discounts, flat-rate discounts, buy-one-get-one-free offers, referral discounts, loyalty rewards, and the like. In some embodiments, the service discount may be applied to a single service or a package of services. In some embodiments, the service discount may be offered for a limited time or on an ongoing basis. In an embodiment, the provider 116 may manually input the service discount and provide the service discount to a user 120. In another embodiment, the service discount may be automatically generated as a function of a user service token using at least a processor 104. The user service token described herein is further described below. In some embodiments, the at least a processor 104 may generate the service discount using a discount machine learning model. The discount machine learning model may be trained with discount training data. The discount machine learning model and the discount training data may be consistent with any machine learning model and training data in the entirety of this disclosure. In some embodiments, the discount training data may correlate a number of user service token to the service discount. As a non-limiting example, when the user service token includes 0 service token, the discount training data may correlate the 0 service token to 0% service discount. As another non-limiting example, when the user service token includes 1 service token, the discount training data may correlate the 0 service token to 5% service discount. As another non-limiting example, when the user service token includes 5 service token, the discount training data may correlate the 0 service token to 10% service discount. In some embodiments, the discount training data may be received from one or more users 120, service database 132, external computing devices, and/or previous iterations of processing. As a non-limiting example, the discount training data may include instructions from a user 120, who may be an expert user, a past user in embodiments disclosed herein, or the like, which may be stored in memory and/or stored in the service database 132, where the instructions may include labeling of training examples. In some embodiments, the at least a processor 104 may determine the service discount as a function of the service token, as which the service discount may be a hard-coded value. In some embodiments, processor 104 may look up service discount using service token in a lookup table. In other embodiments, at least a processor 104 may determine the service discount without any input from another system or device or looking up the service discount in a lookup table or the service database 132. As a non-limiting example, when the service token is 0, the service discount may include a hard-coded value for the 0 service token, such as but not limited to 0%. As a non-limiting example, when the service token is 2, the service discount may include a hard-coded value for the 2 service token, such as but not limited to 10%.

With continued reference to FIG. 1, in an embodiment, the provider device 148 may include a personal device. For the purposes of this disclosure, a "personal device" is any device personally owned by a provider or a user. As a non-limiting example, the personal device may include a laptop, tablet, mobile phone, smart watch, or things of the like. In some embodiments, a provider device 148 may include an interface configured to receive inputs from a provider 116. In some embodiments, the provider may have a capability to process, store or transmit any information independently. In another embodiment, the provider device 148 may include a shared device. For the purposes of this disclosure, a "shared device" is a device that is designed for use by multiple providers or users. In some embodiments, the shared device may be used by different providers at different times. As a non-limiting example, the shared devices may include desktop computers, kiosks, screens, tablets, or the like.

With continued reference to FIG. 1, in some embodiments, a provider device 148 may include a camera. In some embodiments, the provider device 148 may include a microphone. For the purposes of this disclosure, a "microphone" is a device that converts sound waves into electrical signals. The microphone may be a type of transducer that is used to capture audio signals and convert them into an electrical form that can be amplified, recorded, or transmitted to other devices. In some embodiments, a provider 116 may input provider data 112 using the microphone. In some embodiments, the provider device 148 may include an input device. For the purposes of this disclosure, an "input device" is a device that is used by a provider or a user to input data. As a non-limiting example, the input device may include keyboard, mouse, touch screen, microphone, and the like.

With continued reference to FIG. 1, in some embodiments, a provider device 148 may include an output device. For the purposes of this disclosure, "output device" is a device that outputs information to a provider or a user. In some embodiments, the output device may be incorporated wholly or in part in the provider device; for instance, The output device may include a display and speakers coupled to a mobile device. The output device may be coupled directly to the provider device 148 or may communicated with the provider device using a network; The output device may be incorporated in or include provider device 148, at least a processor 104 and/or any element thereof, using wireless or wired communication.

With continued reference to FIG. 1, in an embodiment, an output device may include a display. For the purposes of this disclosure, a "display" is a device that presents visual information or data. As a non-limiting example, the display may present visual information or data in one or more forms of text, graphics, images, video, and the like. The display may be configured to provide a way for a provider 116 to view and/or interact with information, including but not limited to provider data 112, user data 136, relation data 140, provider map 144, and/or the like. In some embodiments, the display may be implemented in any provider device 148 disclosed in the entirety of this disclosure. In some embodiments, the display may include different technologies, such as liquid crystal display (LCD), a light-emitting diode (LED), organic light-emitting diode (OLED), plasma, projection, touch screen, and/or the like. In some embodiments, the display may include varying resolutions, sizes, and aspect ratios.

With continued reference to FIG. 1, in another embodiment, an output device may include an audio device. For the purposes of this disclosure, an "audio device" is a device that outputs audio information or data. As a non-limiting example, the audio device may include a speaker. For the purposes of this disclosure, a "speaker" is a device that converts electrical signals into sound waves that can be heard by the human ear. In another embodiment, the output device may include a tactile device. For the purposes of this disclosure, a "tactile device" is a device that outputs information that is intelligible using the sense of touch. In some embodiments, the tactile device may include a haptic output such as a vibration. In some embodiments, the tactile device may produce patterns having geometric forms that are intelligible to the provider 116 using the sense of touch; for instance, the tactile device may output letters in braille using a set of retractable pins or bumps that can be extended and retracted to form braille characters, similarly to devices used with screen readers. In some embodiments, the tactile device may output other recognizable shapes, such as directional arrows or geometric forms; the tactile device may, as another example, output a map vignette of the immediate area.

With continued reference to FIG. 1, in some embodiments, provider data 112 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, at least a processor 104 may generate a web crawler to scrape provider data 112 from provider's service website, social media sites, blogs, or forums. A web crawler may be generated by at least a processor 104. In some embodiments, the web crawler may be trained with information received from a provider 116 through a user interface. In some embodiments, the web crawler may be configured to generate a web query. A web query may include search criteria received from provider 116. For example, provider 116 may submit a plurality of websites for the web crawler to search to provider data 112 statistics from and correlate to provider information 124, provider address, and the like. Additionally, the web crawler function may be configured to search for and/or detect one or more data patterns. A "data pattern" as used in this disclosure is any repeating forms of information. In some embodiments, the web crawler may be configured to determine the relevancy of a data pattern. Relevancy may be determined by a relevancy score. A relevancy score may be automatically generated by at least a processor 104, received from a machine learning model, and/or received from the provider 116. In some embodiments, a relevancy score may include a range of numerical values that may correspond to a relevancy strength of data received from a web crawler function. As a non-limiting example, a web crawler function may search the Internet for provider data 112 related to the provider 116. The web crawler may return provider data 112, such as, as non-limiting examples, provider information 124, provider address 128, and the like.

With continued reference to FIG. 1, memory 108 contains instructions configuring at least a processor 104 to receive user data 136. For the purposes of this disclosure, "user data" is information related to a user. In some embodiments, the user data 136 may be obtained from a service database 132. In some embodiments, the user data 136 may be stored in the service database 132. In some embodiments, the user data 136 may include user information 152. For the purposes of this disclosure, "user information" is a user's personal information. As a non-limiting example, user information 152 may include a name, gender, contact information, date of birth, social security number, and the like. As another non-limiting example, user information 152 may include an image of the user. In some embodiments, the user information 152 may include financial information, legal information, medical information, employment information, immigration information, criminal history, contracts, leases, family information, business information, intellectual property information, insurance information, educational information, and any information thereof. In another embodiments, user information 152 may include user billing information. For the purposes of this disclosure, "user billing information" is information of a user's payment method. As a non-limiting example, the user billing information may include payment method preference, payment history, credit card information, debit card information, and the like. For the purposes of this disclosure, "card information" is information related to a user's card that can make a payment. As a non-limiting example, the card information may include card numbers, card security codes, the user's personal identification number (PIN) for the card, the card's expiration date, and the user's name on the card, and the like. Persons skilled in the art, upon reviewing the entirety of this disclosure, may appreciate various user information that can be used for an apparatus 100.

With continued reference to FIG. 1, in some embodiments, user information 152 may include service request data. For the purposes of this disclosure, "service request data" is information that a user prefer for a provider or provider's service to have. As a non-limiting example, the service request data may include the user's desired name, gender, contact information, related entity, service experience, service area, service plan, service history, referral, review, service availability, service cost, specialty, education, certification, or the like of a provider 116 or provider's service. As another non-limiting example, the service request data may include a keyword. For example, and without limitation, the keyword of the service request data may include legal, healthcare, financial, consulting, transportation, education, entertainment, travel, cleaning, maintenance, fitness, pet care, real estate, occupation, or the like. For example, and without limitation, the keyword of the service request data may include litigation, transaction, estate planning, intellectual property, corporate law, immigration, or the like. In some embodiments, the service request data may include a specific issue the user 120 wants to solve by using the provider's service. As a non-limiting example, the user request data may include a specific legal issue the user 120 wants to solve by using the provider's service. The examples above are merely examples for the user request data and persons skilled in the art, upon reviewing the entirety of disclosure, may appreciate various service request data that can be used in an apparatus 100.

With continued reference to FIG. 1, in some embodiments, user data 136 includes a user address 156. For the purpose of this disclosure, a "user address" is information related to a location of a user. In some embodiments, the user address may not be necessarily a location that one or more users 120 resides. In some embodiments, the user address may include any location the one or more users 120 input in a user device 160. As a non-limiting example, the user address 156 may include a name and number of street, a name and/or number of a building, city, stat, country and zone improvement plan (zip) code. For example, and without limitation, the user address of the Empire State Building may include 20 W 34th St., New York, NY 10001. As another non-limiting example, the user address 156 may include a global positioning system (GPS) coordinate. As a non-limiting example, alphanumeric characters of the GPS coordinate of the Empire State Building in New York City may include N40° 44.9064', W073° 59.0735'. In another embodiment, alternatively, the GPS coordinate may include a numeric format. As a non-limiting example, a numeric format of the GPS coordinate of the Empire State Building in New York City may include 40.748440, −73.984559.

With continued reference to FIG. 1, in some embodiments, a provider address 128 and a user address 156 may be obtained using a navigation application programing interface (API). As a non-limiting example, the navigation API may include GOOGLE MAPS application programing interfaces (APIs). In a non-limiting example, at least a processor 104 may be configured to call APIs for location or address retrieval (provider address 128 or user address 156). The at least a processor 104 may be further configured to convert a location retrieved through the APIS for location retrieval into a coordinate using Geocoding APIs, compare the coordinate to the check point coordinate, and calculate a coordinate difference, wherein the coordinate difference is an evaluation of the distance between converted coordinate and the check point coordinate. In some embodiments, the provider address 128 and the user address 156 may be obtained using any geolocation techniques such as geofencing, GPS, IP address geolocation, and the like. As used in this disclosure, a "geofence" is a virtual perimeter for a real-word geographic area. In some cases, geofence may be dynamically generated/determined as in a radius around a point location, or match a predefined set of boundaries such as, without limitation, school zones, business zones, factory zones, neighborhood boundaries, and the like thereof.

With continued reference to FIG. 1, in some embodiments, user data 136 may be obtained from a user device 160. For the purposes of this disclosure, a "user device" is any device a user may use to input data. As a non-limiting example, a user 120 may input user data 136 such as but not limited to user information 152, user address 156, and the like. In an embodiment, the user device 160 may include a personal device. As a non-limiting example, the personal device may include a laptop, tablet, mobile phone, smart watch, or things of the like. In some embodiments, the user device 160 may include an interface configured to receive inputs from the user 120. In some embodiments, the user may have a capability to process, store or transmit any information independently. In another embodiment, user device 160 may include a shared device. In some embodiments, the shared device may be used by different users at different times. As a non-limiting example, the shared devices may include desktop computers, kiosks, screens, tablets, or the like.

With continued reference to FIG. 1, in some embodiments, user device 160 may include a camera. In some embodiments, user device 160 may include a microphone. The microphone may be a type of transducer that is used to capture audio signals and convert them into an electrical form that can be amplified, recorded, or transmitted to other devices. In some embodiments, a user 120 may input user data 136 using the microphone. In some embodiments, the user device may include an input device. As a non-limiting example, the input device may include keyboard, mouse, touch screen, microphone, and the like.

With continued reference to FIG. 1, in some embodiments, a user device 160 may include an output device. In some embodiments, the output device may be incorporated wholly or in part in the user device 160; for instance, The output device may include a display and speakers coupled to a mobile device. The output device may be coupled directly to the user device 160 or may communicated with the user device 160 using a network; The output device may be incorporated in or include user device 160, at least a processor 104 and/or any element thereof, using wireless or wired communication.

With continued reference to FIG. 1, in an embodiment, an output device may include a display. As a non-limiting example, the display may present visual information or data in one or more forms of text, graphics, images, video, and the like. The display may be configured to provide a way for a user 120 to view and/or interact with information, including but not limited to provider data 112, user data 136, relation data 140, provider map 144, and/or the like. In some embodiments, the display may be implemented in any user device 160 disclosed in the entirety of this disclosure. In some embodiments, the display may include different technologies, such as liquid crystal display (LCD), a light-emitting diode (LED), organic light-emitting diode (OLED), plasma, projection, touch screen, and/or the like. In some embodiments, the display may include varying resolutions, sizes, and aspect ratios.

With continued reference to FIG. 1, in another embodiment, an output device may include an audio device. As a non-limiting example, the audio device may include a speaker. In another embodiment, the output device may include a tactile device. In some embodiments, the tactile device may include a haptic output such as a vibration. In some embodiments, the tactile device may produce patterns having geometric forms that are intelligible to the user 120 using the sense of touch; for instance, the tactile device may output letters in braille using a set of retractable pins or bumps that can be extended and retracted to form braille characters, similarly to devices used with screen readers. In some embodiments, the tactile device may output other recognizable shapes, such as directional arrows or geometric forms; the tactile device may, as another example, output a map vignette of the immediate area.

With continued reference to FIG. 1, user data 136 may be obtained from a chatbot operating on or communicating with a user device 160. For the purposes of this disclosure, "chatbot" is an artificial intelligence (AI) program designed to simulate human conversation or interaction through text or voice-based communication. Chatbots can be programmed to respond to a user's queries, provide information, or perform specific tasks based on pre-defined rules or machine learning algorithms. Chatbots can also be programmed to query a user 120 to receive the user data 136. The user data 136 received from the chatbot may be stored in a service database 132. As a non-limiting example, the user 120 may input user information 152 or user address 156 into the user device 160 as the chatbot query the user 120 related to the user information or the user address 156. In some embodiments, the chatbot disclosed herein is further described with respect to FIG. 3.

With continued reference to FIG. 1, in some embodiments, user data 136 may be derived from a web crawler. The web crawler may be seeded with platform URLs, wherein the crawler may then visit the next related URL, retrieve the content, index the content, and/or measures the relevance of the content to the topic of interest. In some embodiments, at least a processor 104 may generate a web crawler to scrape user data 136 from social media sites, blogs, or forums. A web crawler may be generated by at least a processor 104. In some embodiments, the web crawler may be trained with information received from a user 120 through a user interface. In some embodiments, the web crawler may be configured to generate a web query. A web query may include search criteria received from the user 120. For example, the user 120 may submit a plurality of websites for the web crawler to search to user data 136 statistics from and correlate to user information 152, user address 156, and the like. Additionally, the web crawler function may be configured to search for and/or detect one or more data patterns. In some embodiments, the web crawler may be configured to determine the relevancy of a data pattern. Relevancy may be determined by a relevancy score. A relevancy score may be automatically generated by at least a processor 104, received from a machine learning model, and/or received from the user 120. In some embodiments, a relevancy score may include a range of numerical values that may correspond to a relevancy strength of data received from a web crawler function. As a non-limiting example, a web crawler function may search the Internet for user data 136 related to the user 120. The web crawler may return user data 136, such as, as non-limiting examples, user information 152, user address 156, and the like.

With continued reference to FIG. 1, in some embodiments, user data 136 may be obtained using optical character recognition (OCR). As a non-limiting example, the user data 136 may be obtained by analyzing documents 162. For the purposes of this disclosure, "document" is a recorded piece of information. In some embodiments, the document 162 may include user document. For the purposes of this disclosure, "user document" is document related to a user. As a non-limiting example, the user document may include a budgeting spreadsheet of a user's finances, bank statement, tax return, family, legal, academic, business, government related documents, and the like. As another non-limiting example, the user document may include a survey. As a non-limiting example, the user document may include any documents related to user 120's name, gender, contact information, date of birth, social security number, and the like. As another non-limiting example, the user document may include any documents related to user 120's financial information, legal information, medical information, employment information, immigration information, criminal history, contracts, leases, family information, business information, intellectual property information, insurance information, educational information, and any information thereof. In some embodiments, the user document may be stored in a service database 132. In an embodiment, the user document may be retrieved from the service database 132. In another embodiment, the user document may be received from a user device 160. In some embodiments, the user document may be retrieved from an immutable sequence listing. In some embodiments, the user document may be retrieved from a cloud storage. The document 162 disclosed herein is further described below.

With continued reference to FIG. 1, for the purposes of this disclosure, an "optical character recognition" is a technology that enables the recognition and conversion of printed or written text into machine-encoded text. In some cases, at least a processor 104 may be configured to recognize a keyword from user document using the OCR to find user data 136. In some embodiments, at least a processor 104 may be configured to recognize a user data keyword from the user data 136 using the OCR. For the purposes of this disclosure, a "user data service keyword" is a keyword that represents user data that indicates a type of service a user. As a non-limiting example, the user data service keyword may include legal, healthcare, financial, consulting, transportation, education, entertainment, travel, cleaning, maintenance, fitness, pet care, real estate, occupation, or the like. As another non-limiting example, the user data service keyword may include litigation, transaction, estate planning, intellectual property, corporate law, immigration, or the like. As another non-limiting example, the user data service keyword may be consistent with a keyword of user request data. In some embodiments, at least a processor 104 may be configured to recognize the user data keyword from user request data of the user data 136 using the OCR. As a non-limiting example, when the user request data includes a specific issue a user 120 wants to solve by using a provider's service, the at least a processor 104 may recognize, using the OCR, the user data keyword, from the user request data. In some embodiments, the at least a processor 104 may be configured to recognize the user data keyword from user document using the OCR. In some cases, at least a processor 104 may transcribe much or even substantially all provider data 112 or user data 136.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from provider data 112 or user data 136 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of provider data 112 or user data 136. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the provider data 112 or user data 136 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 4. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes provider data 112 or user data 136. Since the adaptive classifier may have learned something useful a little too late to recognize characters on the first pass, a second pass may be run over the provider data 112 or user data 136. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, memory 108 contains instructions configuring at least a processor 104 to determine relation data 140. For the purposes of this disclosure, "relation data" is provider data that shares common attributes or characteristics with user data. In some embodiments, at least a processor 104 is configured to determine the relation data 140 as a function of provider data 112 and user data 136. As a non-limiting example, at least a processor 104 may compare the provider data 112 and the user data 136 and determine the relation data 140, when they share a common data. In some embodiment, the relation data 140 may include an information relation 164. For the purposes of this disclosure, an "information relation" is relation data that is determined as a function of provider information and service request data. As a non-limiting example, when the provider information 124 includes a gender of provider 116 as female and the service request data includes a female, then the information relation 164 of the relation data 140 may include female as a gender of provider 116 of the provider information 124. As another non-limiting example, when the provider information 124 includes service experience as 6 years and the service request data includes 6 years, then the information relation 164 of the relation data 140 may include 6 years of service experience of the provider information 124. As another non-limiting example, the information relation 164 of the relation data 140 may include a license in a certain area or jurisdiction when the user request data and the provider information 124 includes the license. The relation data 140 includes an address relation 168. For the purposes of this disclosure, an "address relation" is relation data that is determined as a function of a provider address and a user address. As a non-limiting example, when the provider address 128 includes 02210 as a zip code and the user address 156 includes 02210 as user's zip code, then the address relation 168 of the relation data 140 may include 02210 as a zip code of provider 116 of the provider address 128. As another non-limiting example, when the provider address 128 includes 'New York' and the user address 156 includes 'New York,' then the address relation 168 of the relation data 140 may include 'New York' of the provider address 128. In some embodiments, the relation data 140 may be stored in a service database 132. In some embodiments, the relation data 140 may be retrieved from the service database 132.

With continued reference to FIG. 1, in some embodiments, relation data 140 may be determined manually by a provider 116 or a user 120. In a non-limiting example, the user 120 may review all provider data 112 and select the provider data 112 that matches with user data 136. For example, and without limitation, the user 120 may review a provider address 128 and select the provider address 128 that matches with a user address 156. For example, and without limitation, the user 120 may review the provider information 124 and select the provider information 124 that matches with service request data of user information 152.

With continued reference to FIG. 1, additionally, or alternatively, the process of determining relation data 140 may be fully automated. In a non-limiting example, determining the relation data 140 may include matching, by at least a processor 104, provider data 112 to user data 136. In some embodiments, the at least a processor 104 may be configured to search the provider data 112 for the relation data 140 using one or more searching algorithms, such as, without limitation, linear search, binary search, and the like based on similarity between the provider data 112 and the user data 136. Continuing the example, at least a processor 104 may be configured to pair each user data 136 to the provider data 112 and calculate a similarity between user data 136 to the provider data 112. Similarity may be calculated using distance functions, such as, without limitation L2 norm, Euclidean distance, squared Euclidean distance, Canberra distance, Chebyshev distance, Minkowski distance, Cosine distance, Pearson correlation distance, spearman correlation, Mahala Nobis distance, standardized Euclidean distance, Chi-square distance, Jensen-Shannon distance, Levenshtein distance, Dice distance, and the like thereof. Processor 104 may be further configured to select a pair of user data 136 and the provider data 112 with maximum similarity (or otherwise minimum dissimilarity) and match corresponding relation data 140.

With continued reference to FIG. 1, in some embodiments, relation data 140 may be determined using a machine learning process. A "machine learning process," as used in this disclosure, is a process that automatedly uses a body of data known as "training data" and/or a "training set" (described further below in this disclosure) to generate an algorithm that will be performed by a processor/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below. In some embodiments, the machine learning process may include at least a processor 104 to generate a relation machine learning model 172, wherein generating the relation machine learning model 172 may include training the relation machine learning model 172 using relation training data, and wherein the relation training data may include a plurality of provider data 112 and user data 136 correlated to the relation data 140. Plurality of provider data 112 and user data 136 may include a plurality of most suitable provider data 112 and user data 136 for plurality of relation data 140; for instance, for given provider data 112 and user data 136, a most suitable information relation of the relation data 140 may include a most suitable provider information 124, wherein the most suitable provider information 124 may include one or more relation data 140 related data indicating such as, without limitation, service request data of the user data 136 that is equivalent to the provider information 124, and the like thereof. For another instance, for given provider data 112 and user data 136, a most suitable address relation of the relation data 140 may include a most suitable provider address 128, wherein the most suitable provider address 128 may include one or more relation data 140 related data indicating such as, without limitation, user request data or user address 156 of the user data 136 that is equivalent to the provider address 128, and the like thereof. Relation training data may come from service database 132 or be provided by a provider 116 or a user 120. In some embodiments, relation machine learning model 172 may obtain relation training data for generating relation machine learning model 172 by querying a communicatively connected service database 132 that includes past inputs and outputs; for instance, without limitation, relation training data may include a plurality of previous entity actions posted by the provider 116 or the user 120 as input correlated to a plurality of previous identified relation data 140 as output. In some embodiments, correlations may indicate causative and/or predictive links between data, which may be modeled as relationships, such as mathematical relationships, by machine-learning models, as described in further detail below. In a non-limiting example, at least a processor 104 may determine a most suitable relation data 140 for a given provider data 112 and user data 136 through the relation machine learning model 172 using the machine learning process. The at least a processor 104 may then determine relation data 140; for instance, the at least a processor 104 may select relation data 140 with a maximum similarity (or otherwise minimum dissimilarity) to the most suitable relation data 140 determined by relation machine learning model 172. Similarity may be calculated by comparing using one or more distance functions described above.

With continued reference to FIG. 1, memory 108 contains instructions configuring at least a processor 104 to generate a provider map 144. For the purposes of this disclosure, a "provider map" is a visual representation of providers in a geographical area. As a non-limiting example, the provider map 144 may show a location of various providers 116. In some embodiments, the provider map 144 may be used by one or more users 120 to search for nearby providers 116. For example, and without limitation, the provider map 144 can be used by users 120 to compare various providers 116 and to choose one that is more compatible to the users 120. In some embodiments, provider map 144 may be used to identify areas with high concentrations of providers 116, creating service area polygons to show the extent of provider coverage, identifying gaps in coverage using buffer analysis, or the like. In some embodiments, the provider map 144 may be used by one or more providers 116 to identify gaps in services and to plan and allocate resources more effectively. For example, and without limitation, provider map 144 can be used to identify areas with a high concentration of elderly users who may require specialized services. For example, and without limitation, the provider map 144 can be used to identify areas with a shortage of providers 116. For example, and without limitation, provider map 144 can be used by providers 116 to compare various providers 116 and to plan a service plan to be more compatible.

With continued reference to FIG. 1, in some embodiments, at least a processor 104 is configured to generate a provider map 144 as a function of provider data 112. As a non-limiting example, the provider map 144 may be generated using a provider address 128. For example, and without limitation, provider map 144 may include a geographical map that displays one or more providers 116 within the specific geographical location. For example, and without limitation, providers 116 may be displayed with a visual representation of the providers 116 on the provider map 144. As a non-limiting example, the visual representation of the providers 116 may include an icon, image, text, and the like. For example, and without limitation, each of the providers 116 may be displayed as a pin-point icon on the provider map 144. For example, and without limitation, each of the providers 116 may include a circle icon on the provider map 144. For example, and without limitation, each of the providers 116 may include an image of the providers 116 on provider map 144. As another non-limiting example, the provider map 144 may be generated as a function of the relation data 140 as a function of a user response 174 or provider response (e.g. a relation function 176 of the provider map 144 as described below). As another non-limiting example, the provider map 144 may display provider information 124 as a function of a user response 174 or provider response. As another non-limiting example, the provider map 144 may display an information relation 164 as a function of a user response 174 or provider response (e.g. the relation function 176 of the provider map 144 as described below). As another non-limiting example, the provider map 144 may display an information relation 164 as a function of user data 136 (e.g. a filter function 180 of the provider map 144 as described below). The user response 174 or provider response disclosed herein are further described below. For example, and without limitation, one or more users 120 or providers 116 may click the visual representation of the providers 116 on the provider map 144, then the at least a processor 104 may display corresponding provider information 124 on the provider map 144. For example, and without limitation, one or more users 120 or providers 116 may click the visual representation of the providers 116 on the provider map 144, then the at least a processor 104 may display corresponding information relation 164 of the relation data 140 on the provider map 144.

With continued reference to FIG. 1, in some embodiments, a provider map 144 may include a match button. For the purposes of this disclosure, a "match button" a user interface element that allows a user to choose a provider or the provider's service on a provider map. In some embodiments, each of providers 116 displayed on the provider map 144 may include the match button. In some embodiments, at least a processor 104 may generate a user interface that generates and displays the match button on the provider map 144. In a non-limiting example, a user 120 may click or touch the match button to choose the provider 116 or the provider 116's service on the provider map 144. In another non-limiting example, the user 120 may send a voice command to choose the provider 116 or the provider 116's service on the provider map 144. In some embodiments, when the provider 116 or the provider 116's service on the provider map 144 is chosen by the provider 116, at least a processor 104 may generate match datum as described below.

With continued reference to FIG. 1, in some embodiments, a provider map 144 may be generated using a Geographic Information System (GIS) technology. For the purposes of this disclosure, "Geographic Information System technology" is a computer-based tool that captures, stores, analyzes, and presents geospatial data. As a non-limiting example, the geospatial data may include a provider address 128. The GIS technology may be used to manage, analyze, and visualize spatial information. GIS technology may combine multiple sources of data, including maps, satellite images, aerial photographs, and other spatial data, with attribute data, such as demographics, to create a spatial database. The spatial database may be then used to create maps, conduct spatial analyses, and generate reports and other outputs. The spatial database may be consistent with a service database 132. In some embodiments, the GIS technology may geocode a provider address 128 into geographic coordinates (e.g. latitude and longitude) that can be plotted on provider map 144. In some embodiments, the provider map 144 may be generated using mapping application programming interfaces (APIs). For the purposes of this disclosure, "mapping application programming interfaces" are programming interfaces that allow for software to communicate with a mapping application. The mapping APIs may provide a set of tools and services that allow developers to access and manipulate maps, geocoding services, routing, and other location-based services. As a non-limiting example, the mapping APIs may include GOOGLE MAPS API, MAPBOX API, OPENSTREETMAP API, BING MAPS, APPLE MAPS, and the like.

With continued reference to FIG. 1, in some embodiments, a provider map 144 may include a relation function 176. For the purposes of this disclosure, a "relation function" is a feature of a provider map that is configured to display relation data on the provider map. As a non-limiting example, the relation function may display an information relation 164 and an address relation 168 on the provider map 144. In some embodiments, the relation function 176 may be displayed as a function of a user response 174 or provider response. As a non-limiting example, when a user 120 chooses to see the relation data 140, then at least a processor 104 may display the relation data 140 on the provider map 144. (e.g. the relation function 176). For example, and without limitation, the provider map 144 may only display a visual representation of providers 116 that includes an address relation 168 of the relation data 140. For example, and without limitation, the provider map 144 may only display the information relation 164 of providers 116. In some embodiments, provider information 124 or information relation 164 may be displayed automatically. As a non-limiting example, the provider information of the information relation 164 may be displayed close to a visual representation of the providers 116 or provider address 128 on the provider map 144 without any response from a user 120. In some embodiments, the provider information 124 and the information relation 164 may be displayed as a function of the user response 174 or provider response. As a non-limiting example, the provider information of the information relation 164 may be displayed close to a visual representation of the providers 116 or provider address 128 on the provider map 144 when the user 120 click the visual representation. As another non-limiting example, the provider information of the information relation 164 may be displayed close to a visual representation of the providers 116 or provider address 128 on the provider map 144 when the user 120 hover over the visual representation using a mouse of an input device.

With continued reference to FIG. 1, in some embodiments, a provider map 144 may include a filter function 180. In some embodiments, the filter function 180 of the provider map 144 may be used as a function of a user response 174 or provider response as described below. For the purposes of this disclosure, a "filter function" is a feature of a provider map that is configured to display filtered relation data on the provider map. For the purposes of this disclosure, "filtered relation data" is relation data that is within a user request range. For the purposes of this disclosure, a "user request range" is a range of values input by a user on a user device. In some embodiments, service request data of user data 136 may include the user request range. In some embodiments, the user request range may include numerical values of the service request data. As a non-limiting example, the user request range may include specific amount of service experience, referral, review, service cost, and the like. For example, and without limitation, the user request range may include service experience more than 6 years, service experience between 4 to 6 years, providers with only 5 stars review, providers with only more than 4 stars review, service cost between $400-$700, service cost less than $1000, and the like. Persons skilled in the art, upon reviewing the entirety of this disclosure, may appreciate various user request range that can be used in an apparatus 100. In some embodiments, the user request range may include characteristic values. The user request range may be used as a keyword. As a non-limiting example, the user request range may include specific gender, specific name, specific education, specific certification, specific service area, specific organization, specific service plan, specific service availability, specific specialty and the like. In some embodiments, the filtered relation data may include relation data 140 that is within the user request range. As a non-limiting example, when the user request range includes service cost between $400-$700, the filtered relation data may include the relation data 140 that includes service cost between $400-$700. As another non-limiting example, when the user request range includes service experience more than 6 years, the filtered relation data may include the relation data 140 that includes service experience more than 6 years.

With continued reference to FIG. 1, in some embodiments, a provider map 144 may include a comparison function. For the purposes of this disclosure, a "comparison function" is a function that is configured to display comparison of relation data displayed on a provider map. In some embodiments, the comparison function may provide users 120 to evaluate and contrast multiple services and make informed decisions about which option best fits their needs. In some embodiments, the comparison function may include a format to compare an information relation 164 of relation data 140 such as but not limited to a table, list, grid, and the like. In some embodiments, the comparison function may be generated as a function of a user response 174 or provider response. As a non-limiting example, a user 120 or a provider 116 may select multiple providers 116 to compare the multiple providers. In some embodiments, the comparison function may be generated using a user request range. As a non-limiting example, the comparison function may generate a comparison of the relation data 140 that is within the user request range.

With continued reference to FIG. 1, memory 108 contains instructions configuring at least a processor 104 to display a provider map 144 on a user device 160. In some embodiments, the at least a processor 104 may display a relation function 176, a filter function 180, a comparison function, relation data 140 on the user device. The user device 160 disclosed herein is further described above. In some embodiments, the at least a processor 104 may be further configured to generate a user interface displaying the provider map 144 on the user device 160. For the purposes of this disclosure, a "user interface" is a means by which a user or a provider and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 104. For example, a smart phone, tablet, or laptop operated by a user 120 or a provider 116. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. In some embodiments, the user interface may display a dashboard to a user device 160 or a provider device 148. For the purposes of this disclosure, a "dashboard" is a visual representation of data design for a user or a provider that displays information and allow the user or the provider to monitor or manage the information. In some embodiments, the user 120 or provider 116 may customize the dashboard using the user device 160 or the provider device 148. As a non-limiting example, the provider 116 may monitor or manage information related to provider data 112, user service token, service plan, service cost, service discount, user management (e.g. client management), user landscape, provider landscape, provider map 144, and the like. As another non-limiting example, the user 120 may monitor or manage information related to user data 136, provider map 144, user service activity, and the like.

With continued reference to FIG. 1, in some embodiments, at least a processor 104 may be configured to generate a language switcher for a user 120 or a provider 116. In some embodiments, the user 120 or provider 116 may optionally use the language switcher. For the purposes of this disclosure, a "language switcher" is a feature that allows users or providers to choose languages available to display information. In some embodiments, the user 120 or provider 116 may push a button, switch, menu generated from a user interface on a user device 160 or provider device 148 to switch to difference language. In some embodiments, when the user 120 or provider 116 selects a language, the user device 160 or provider device 148 may display the corresponding version of the content in the selected language. In some embodiments, the at least a processor 104 may use a process called website localization to convert language. For the purposes of this disclosure, "website localization" is a process of adapting a website to a specific language or culture. This can involve translating text, images, and multimedia content, as well as adjusting formatting and design elements to suit local preferences. In an embodiment, generating the language switcher may include manual translation. As a non-limiting example, the user 120 or provider 116 may manually translate the content of the information into the target language. For example, and without limitation, the target language may include English, Spanish, French, German, Chinese, Arabic, Japanese, Russian, Portuguese, Italian, Dutch, Korean, and the like. In another embodiment, generating the language switcher may include machine translation. In some embodiments, the machine translation may include the use of software and algorithms to automatically translate the content of the information into the target language. As a non-limiting example, the machine translation may include rule-based machine translation, statistical machine translation, neural machine translation, and the like.

With continued reference to FIG. 1, in some embodiments, at least a processor 104 may be configured to receive a user response 174 from a user 120. For the purposes of this disclosure, a "user response" is any user's input on a user device. In some embodiments, a user 120 may input the user response 174 using an input device of a user device 160. As a non-limiting example, the user 120 may input the user response 174 using a microphone, keyboard, a mouse, a touch screen, and the like. In some embodiments, the user 120 may input the user response 174 using a chatbot. In some embodiments, the user 120 may input the user response 174 using a user interface. As a non-limiting example, the user 120 may touch a touch screen to click an icon on a screen to input the user response 174. As another non-limiting example, the user 120 may input user response 174 by clicking an image on a screen of a laptop using a mouse. As another non-limiting example, the user 120 may type on a keyboard to input user response 174. In some embodiments, the user response 174 may include any response or input from the one or more users 120 using the user device 160. In some embodiments, the user response 174 may be stored in a service database 132. In some embodiments, the user response 174 may be retrieved from the service database 132.

With continued reference to FIG. 1, in some embodiments, a user response 174 may include a user map response.

For the purposes of this disclosure, a "user map response" is a response of a user related to a displayed provider map on a user device. As a non-limiting example, the user 120 may click, move, drag, and the like the provider map 144 displayed on the user device 160 to input the user response 174. As another non-limiting example, the user response 174 may include choosing a visual representation of a provider 116. As another non-limiting example, the user response 174 may include choosing an area in the map 144 to choose a user address 156. For example, and without limitation, the user 120 may choose a state, zip code, and the like to choose the user address 156 (e.g. relation function 176). As another non-limiting example, the user 120 may drag a range of area in the provider map 144 to choose a user request range (e.g. filter function 180). As another non-limiting example, the user 120 may click the visual representation of the providers 116 in the provider map 144 to view provider information 124 or information relation 164. As another non-limiting example, the user 120 may drag a range of area in the provider map 144 to choose providers to compare for a comparison function. Persons skilled in the art, upon reviewing the entirety of this disclosure, would appreciate, after having read the entirety of this disclosure, various user response 174s that may be used in an apparatus 100.

With continued reference to FIG. 1, in some embodiments, a user response 174 may include a match response. For the purposes of this disclosure, a "match response" is user's input that generates match datum. In some embodiments, the match response may include a user 120's input that chooses a provider 116 or the provider 116's service displayed on a provider map 144. As a non-limiting example, the user 120 may click or touch a match button on the provider map 144 to choose the provider 116 or the provider 116's service. As another non-limiting example, the user 120 may send a voice command using a microphone to choose the provider 116 or the provider 116's service. For the purposes of this disclosure, "match datum" is datum that is related to a provider who a user chose, the provider's service that the user chose, or the user who chose the provider or the provider's service. In some embodiments, the match datum may include a provider 116's name, where the provider 116 is a provider 116 whom a user 120 chose. In some embodiments, the match datum may include provider 116's provider information 124 and the provider's address. In some embodiments, the match datum may include the user 120's name, where the user 120 is a user 120 who chose provider 116 to use the provider 116's service. In some embodiments, the match datum may include the user 120's contact information. In some embodiments, the match datum may include the user 120's service request data. As a non-limiting example, the match datum may include the user 120's specific issue the user 120 wants to solve by using provider 116's service. In some embodiments, the match datum may be generated by at least a processor 104 as a function of the match response. In some embodiments, when the match datum is generated, at least a processor 104 may transmit the match datum to a user device 160. As a non-limiting example, the match datum may be displayed on user device 160. As another non-limiting example, the user 120 may view the match datum on the user device 160. In some embodiments, when the match datum is generated, at least a processor 104 may transmit the match datum to a provider device 148. As a non-limiting example, the match datum may be displayed on the provider device 148. As another non-limiting example, provider 116 may view the match datum on the provider device 148. In some embodiments, when the match datum is generated, at least a processor 104 may generate a service alert 182 as described below.

With continued reference to FIG. 1, in some embodiments, a user response may include a user field input response. For the purposes of this disclosure, a "user field input response" is a user's input on a user device that is related to putting information in a form field of a document. The form field of the document disclosed herein is further described below. In some embodiments, the user field input response may include manually inputting user information 152 into the form field of the document. In some embodiments, the user field input response may include manually inputting user address 156 into the form field of the document. In some embodiments, the user field input response may include manually inputting the provider 116's signature into the form field of the document. By inputting the user field input response, at least a processor 104 may generate a service alert 182 as described below. In some embodiments, the user response may include a user field review response. For the purposes of this disclosure, a "user field review response" is a user's input on a user device that is related to reviewing information in a document. In some embodiments, the user field review response may include reviewing any information in the document (filled user specific document 184 as described below). In some embodiments, the user field review response may include transmitting a user review completion datum from a user device 160 to at least a processor 104. For the purposes of this disclosure, "user review completion datum" is datum that indicates that a user has done reviewing a document. As a non-limiting example, provider 116 may click, touch a review completion button to indicate that the provider 116 has done reviewing the document (filled user specific document 184). For the purposes of this disclosure, a "review completion button" is a user interface element that allows a user or a user to indicate that a review of a document has been completed. The review completion button may be consistent with a match button. As another non-limiting example, provider 116 may send an audio command using a microphone to indicate that the provider 116 is done reviewing the document (filled user specific document 184). In some embodiments, when the at least a processor 104 receives the user review completion datum, the at least a processor 104, then, generate the service alert 182.

With continued reference to FIG. 1, memory 108 contains instructions configuring at least a processor 104 to display a provider map 144 on a provider device 148. The provider device 148 disclosed herein is further described above. In some embodiments, the at least a processor 104 may display a relation function 176, a filter function 180, a comparison function, relation data 140 on the provider device 148. In some embodiments, the at least a processor 104 may be further configured to generate a user interface displaying the provider map 144 on the provider device 148 as described above. In some embodiments, one or more providers 116 may input a provider response using the provider device 148. For the purposes of this disclosure, a "provider response" is any provider's input on a provider device. In some embodiments, a provider 116 may input the provider response using an input device of a provider device 148. As a non-limiting example, provider 116 may input the provider response using a microphone, keyboard, a mouse, a touch screen, and the like. In some embodiments, provider 116 may input the provider response using a chatbot. In some embodiments, provider 116 may input the provider response using a user interface. As a non-limiting example, provider 116 may touch a touch screen to click an icon on a screen to input the provider response. As another non-limiting example, provider 116 may input provider response by clicking an image on a screen of a laptop using a mouse. As another non-limiting example, provider 116 may type on a keyboard to input provider response. In some embodiments, the provider response may include any response or input from one or more providers 116 using the provider device 148. In some embodiments, the provider response may be stored in a service database 132. In some embodiments, the provider response may be retrieved from the service database 132.

With continued reference to FIG. 1, in some embodiments, a provider response may include a provider map response. For the purposes of this disclosure, a "provider map response" is a response of a provider related to a displayed provider map on a provider device. As a non-limiting example, provider 116 may click, move, drag, and the like the provider map 144 displayed on the provider device 148 to input the provider response. As another non-limiting example, the provider response may include choosing a visual representation of a provider 116. As another non-limiting example, the provider response may include choosing an area in the map 144 to choose a provider address 128. For example, and without limitation, provider 116 may choose a state, zip code, and the like to choose the provider address 128. As another non-limiting example, provider 116 may click the visual representation of the providers 116 in the provider map 144 to view provider information 124 or information relation 164. As another non-limiting example, provider 116 may drag a range of area in the provider map 144 to choose providers 116 to compare for a provider landscape described in the entirety of this disclosure. Persons skilled in the art, upon reviewing the entirety of this disclosure, would appreciate, after having read the entirety of this disclosure, various provider responses that may be used in an apparatus 100.

With continued reference to FIG. 1, in some embodiments, a provider response may include a provider field input response. For the purposes of this disclosure, a "provider field input response" is a provider's input on a provider device that is related to putting information in a form field of a document. The form field of the document disclosed herein is further described below. In some embodiments, the provider field input response may include manually inputting provider information 124 into the form field of the document. In some embodiments, the provider field input response may include manually inputting provider address 124 into the form field of the document. In some embodiments, the provider field input response may include manually inputting the provider 116's signature into the form field of the document. By inputting the provider field input response, at least a processor 104 may generate a service alert 182 as described below. In some embodiments, the provider response may include a provider field review response. For the purposes of this disclosure, a "provider field review response" is a provider's input on a provider device that is related to reviewing information in a document. In some embodiments, the provider field review response may include reviewing any information in the document (filled user specific document 184 as described below). In some embodiments, the provider field review response may include transmitting a provider review completion datum from a provider device 148 to the at least a processor 104. For the purposes of this disclosure, "provider review completion datum" is datum that indicates that a provider has done reviewing a document. As a non-limiting example, provider 116 may click, touch a review completion button to indicate that the provider 116 has done reviewing the document (filled user specific document 184). For the purposes of this disclosure, a "review completion button" a user interface element that allows a user or a provider to indicate that a review of a document has been completed. The review completion button may be consistent with a match button. As another non-limiting example, provider 116 may send an audio command using a microphone to indicate that the provider 116 has done reviewing the document (filled user specific document 184). In some embodiments, when the at least a processor 104 receives the provider review completion datum, the at least a processor 104, then, generate the service alert 182.

With continued reference to FIG. 1, in some embodiments, at least a processor 104 may be configured to classify provider data 112 into one or more provider groups. For the purposes of this disclosure, a "provider group" is a set of associative provider data of a provider. In some embodiments, one or more provider groups may be stored in a service database 132. In some embodiments, one or more provider groups may be retrieved from the service database 132. In some embodiments, each of the one or more provider groups may include one provider 116 of a plurality of providers 116 and related provider data 112. As a non-limiting example, when the plurality of providers 116 includes a first provider, a second provider and a third provider, the one or more provider groups may include a first provider group, a second provider group and a third provider group. Then, in a non-limiting example, each of the first provider group, a second provider group and a third provider group may include a sub-group. For the purposes of this disclosure, a "sub-group" is a sub-set of associative provider data of a provider. As a non-limiting example, each of the first provider group, a second provider group and a third provider group may include a first provider information group, a second provider information group and a third provider information group. Then, in a non-limiting example, each of the first provider information group, the second provider information group and the third provider information group may include a sub-group. For example, and without limitation, the first provider information group may include a sub-group of a first name, gender, contact information, related entity, service experience, service area, service plan, service history, referral, review, service availability, service cost, specialty, education, certification, provider image, and any first group thereof. As another non-limiting example, each of the first provider group, a second provider group and a third provider group may include a first provider address group, a second provider address group and a third provider address group.

With continued reference to FIG. 1, in some embodiments, at least a processor 104 may classify provider data 112 into one or more provider groups using a provider group classifier. As used in this disclosure, a "provider group classifier" is a machine-learning model, such as a mathematical model, neural net, or program generated by a machine learning algorithm known as a "classification algorithm," that sorts user data related inputs into categories or bins of data, outputting one or more user data groups associated therewith. The provider group classifier disclosed herein may be consistent with a classifier disclosed with respect to FIG. 4. In some embodiments, the provider group classifier may be trained with provider group training data correlating a plurality of provider data to one or more provider groups. The training data disclosed herein is further disclosed with respect to FIG. 4. In some embodiments, provider group training data may be stored in a service database 132. In some embodiments, the provider group training data may be received from one or more users 120, providers 116, the service database 132, external computing devices, and/or previous iterations of processing. As a non-limiting example, the provider group training data may include instructions from a user, who may be an expert user, a past user in embodiments disclosed herein, or the like, which may be stored in memory and/or stored in the service database 132, where the instructions may include labeling of training examples.

With continued reference to FIG. 1, in an embodiment, a provider group classifier may be trained with provider group training data correlating providers 116 to one or more provider groups. As a non-limiting example, the provider group training data may correlate a first provider 116 to a first provider group. As another non-limiting example, the provider group training data may correlate a second provider 116 to a second provider group. In another embodiment, the provider group classifier may be trained with provider group training data correlating provider information 124 of providers 116 to the one or more provider groups. As a non-limiting example, the provider group training data may correlate a gender of the first provider 116 to a first gender group of a first provider information group of the first provider group. As another non-limiting example, the provider group training data may correlate a gender of the second provider 116 to a second gender group of a first second information group of the second provider group. In another embodiment, the provider group classifier may be trained with provider group training data correlating provider address 128 of the providers 116 to the one or more provider groups. As a non-limiting example, the provider group training data may correlate a provider address 128 of the first provider 116 to a first gender group of a first provider address group of the first provider group. As another non-limiting example, the provider group training data may correlate a provider address 128 of the second provider 116 to a second gender group of a second address group of the second provider group.

With continued reference to FIG. 1, in some embodiments, at least a processor 104 may be configured to classify provider data 112 into one or more provider groups using a provider group lookup table. For the purposes of this disclosure, a "provider group lookup table" is a lookup table that relates the provider data to one or more provider groups. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in some embodiments, at least a processor 104 may 'lookup' given provider data 112 to find corresponding provider groups using a provider group lookup table. In an embodiment, the provider group lookup table may correlate providers 116 to one or more provider groups. As a non-limiting example, the provider group lookup table may correlate a first provider 116 to a first provider group. As another non-limiting example, the provider group lookup table may correlate a second provider 116 to a second provider group. In another embodiment, the provider group lookup table may correlate provider information 124 of providers 116 to the one or more provider groups. As a non-limiting example, the provider group lookup table may correlate a gender of the first provider 116 to a first gender group of a first provider information group of the first provider group. As another non-limiting example, the provider group lookup table may correlate a gender of the second provider 116 to a second gender group of a first second information group of the second provider group. In another embodiment, the provider group lookup table may correlate provider address 128 of the providers 116 to the one or more provider groups. As a non-limiting example, the provider group lookup table may correlate a provider address 128 of the first provider 116 to a first gender group of a first provider address group of the first provider group. As another non-limiting example, the provider group lookup table may correlate a provider address 128 of the second provider 116 to a second gender group of a second address group of the second provider group.

With continued reference to FIG. 1, in some embodiments, at least a processor 104 may be configured to determine a relation score for relation data 140. For the purposes of this disclosure, a "relation score" is a value representing an evaluation of relation data. In some embodiments, the relation score may be stored in a service database 132. In some embodiments, the relation score may be retrieved from the service database 132. In an embodiment, the relation score may include a quantitative characteristic, such as a numerical value. As a non-limiting example, the relation score may be 0, 1, 2, 3, 5, 10, 20, 100, and the like, where a higher relation score may associate with more relation data 140 in provider data 112 of one provider 116 and lower relation score may associate with less relation data 140 in provider data 112 of another provider 116. In some embodiments, the relation score may start from 0, which may mean that there is no relation data 140. In another embodiment, when the relation score is 0, that means a provider 116 does not have any provider information 124 or provider address 128 of the provider data 112 that matches with user request data or user address 156. In some embodiments, the relation score may be updated in real-time as the at least a processor 104 receives new provider data 112.

With continued reference to FIG. 1, in another embodiment, a relation score may include a quality characteristic, such as a color coding, where each color may be associated with amount of relation data 140 in provider data 112 of a provider 116. As a non-limiting example, the relation score may be red, where red may represent a low number of relation data 140 in provider data 112. As another non-limiting example, the relation score may be green, where green may represent a high number of the relation data 140 in the provider data 112. As another non-limiting example, the relation score may include a grey scale, where the relation score is light grey when the number of relation data 140 in the provider data 112 is low while the relation score gets darker the relation score increases. In some embodiments, the relation score may include low to high scoring. As a non-limiting example, the relation score may be 'low' when there is the number of relation data 140 in the provider data 112 is low and the relation score may be 'high' when the number of relation data 140 in the provider data 112 is high.

With continued reference to FIG. 1, in an embodiment, a user 120 or provider 116 may manually determine a relation score. In another embodiment, at least a processor 104 may determine a relation score using a score machine learning model. For the purposes of this disclosure, an "score machine learning model" is a machine learning model that determines an initial activity score. The score machine learning model disclosed herein may be consistent with a machine learning model disclosed with respect to FIG. 4. The score machine learning model may be trained with score training data. For the purposes of this disclosure, "score training data" is training data that is used to train a score machine learning model. The training data disclosed herein is further disclosed with respect to FIG. 4. In some embodiments, the score training data may be received from a user 120 or provider 116, a service database 132, external computing devices, and/or previous iterations of processing. As a non-limiting example, the score training data may include instructions from the user 120 or provider 116 stored in the service database 132, where the instructions may include labeling examples.

With continued reference to FIG. 1, in some embodiments, score training data may correlate one or more provider groups and relation data 140 to a relation score. As a non-limiting example, the score training data may correlate a number of relation data 140 in the one or more provider groups to the relation score. For example, and without limitation, when a first provider group of the one or more provider groups includes three (3) relation data 140, the score training data may correlate the first provider group to the relation score of 3. For example, and without limitation, when a second provider group of the one or more provider groups includes five (5) relation data 140, the score training data may correlate the first second group to the relation score of 5.

With continued reference to FIG. 1, in some embodiments, at least a processor 104 may determine a relation score using a score lookup table. For the purposes of this disclosure, an "score lookup table" is a lookup table that determines a relation score. The score lookup table disclosed herein may be consistent with a lookup table disclosed above. In some embodiments, the at least a processor 104 may 'lookup' given one or more provider groups and relation data 140 to find a corresponding relation score using the score lookup table. In some embodiments, the score lookup table may correlate a number of relation data 140 in the one or more provider groups to the relation score. For example, and without limitation, when a first provider group of the one or more provider groups includes three (3) relation data 140, the score lookup table may correlate the first provider group to the relation score of 3. For example, and without limitation, when a second provider group of the one or more provider groups includes five (5) relation data 140, the score lookup table may correlate the first second group to the relation score of 5.

With continued reference to FIG. 1, in some embodiments, at least a processor 104 may be configured to generate a provider map 144 as a function of a relation score. In some embodiments, the at least a processor 104 may generate a relation function 176 of the provider map 144 as a function of the relation score. As another non-limiting example, the relation function 176 may display a list of providers 116 in order from the highest relation score to the lowest relation score. A user, for example, and without limitation, may be able to see provider 116 that includes the most similarity to the user's service request data. As another non-limiting example, the relation function 176 may display different visual representation of providers 116 on provider map 144. For example, and without limitation, the visual representation of providers 116 may be different on the provider map 144 as a function of a relation level. As a non-limiting example, when the relation level of a first provider 116 is Level 1, then the visual representation of the first provider 116 may include a red circle. As another non-limiting example, when the relation level of a first provider 116 is Level 2, then the visual representation of the first provider 116 may include a yellow circle. As another non-limiting example, when the relation level of a first provider 116 is Level 3, then the visual representation of the first provider 116 may include a green circle. The visual representation may include any visual representations disclosed in the entirety of this disclosure. In some embodiments, the visual representation may include quantitative characteristic or quality characteristic disclosed above.

With continued reference to FIG. 1, in some embodiments, for the purposes of this disclosure, a "relation level" is a level of a provider's relation score in the provider's group. In some embodiments, the relation level may include Level 0, Level 1, Level 2, Level 3, and the like, where the level 0 may include the lowest relation score and the level 3 may include the highest relation score. "Level 0," "Level 1," "Level 2," "Level 3," and the like are exemplary labels for levels only; as a non-limiting example, "Level 0" represents the lowest level in a series of levels. Alternatively, in some embodiments, the compatibility level may include level very low, level low, level moderate, level high, level very high, and the like, where the level very low may include the lowest relation score and the level very high may include the highest relation score. Persons skilled in the art, upon reviewing the entirety of this disclosure, may appreciate various relation levels that can be used in an apparatus 100. In some embodiments, the relation level may be determined using a level threshold, where each of the relation level includes the level threshold. As a non-limiting example, when Level 1 may include a level threshold of 1, which indicates that when amount of the relation data 140 in the provider group is equal or more than 1, then the relation level of the provider 116 is Level 1. As another non-limiting example, when Level 2 may include a level threshold of 4, which indicates that when amount of the relation data 140 in the provider group is equal or more than 4, then the relation level of the provider 116 is Level 2. As another non-limiting example, when Level 3 may include a level threshold of 8, which indicates that when amount of the relation data 140 in the provider group is equal or more than 8, then the relation level of the provider 116 is Level 3. For the purposes of this disclosure, a "level threshold" is a numerical value that is used to determine a relation level. As a non-limiting example, the level threshold may include any numerical values such as but not limited to 1, 15, 49, 100, 200, and the like. In some embodiments, the level threshold may be manually determined by a provider 116 or a user 120. In some embodiments, the level threshold may be stored and/or retrieved in and/or from a service database 132.

With continued reference to FIG. 1, in some embodiments, at least a processor 104 may further generate a provider landscape as a function of a relation score. For the purposes of this disclosure, a "provider landscape" is an analysis of providers providing a similar service. As a non-limiting example, the provider landscape may include an analysis of a legal service providers. As another non-limiting example, the provider landscape may include an analysis of educational service providers, and any service providers thereof. In some embodiments, the provider landscape may encompass an analysis all the providers 116 of service and their information (provider information 124), such as their size, reputation, pricing, location, and other relevant factors. In some embodiments, the provider landscape may include providers 116 within a particular geographic area (provider address 128). As a non-limiting example, the provider landscape may include providers 116 within the same state, same zip code, same country, or the like. In an embodiment, at least a processor 104 may generate a heat map as a function of the relation score. For example, and without limitation, the heat map may include a color coding, where an area that includes providers 116 with the highest relation score is colored in red and another area that includes providers 116 with lowest relation score is colored in green. In another embodiment, at least a processor 104 may generate a graph that analyzes provider information 124 of other providers 116 in a specific geographic location. For example, and without limitation, the provider landscape may include a graph that analyzes service costs provided for users 120 by providers 116 that are located within a same provider address 128 such as without limitation providers 116 that includes a same zip code, state, city, or the like. The graph, in a non-limiting example, may display a provider 116 with the highest relation score and another provider 116 with the lowest relation score. In some embodiments, provider 116 may adjust provider information 112 after reviewing the provider landscape. As a non-limiting example, the provider 116 may adjust a service cost of the provider information 112 using user interface of a provider device 148 after reviewing the graph that shows analysis of service costs provided for users 120 by providers 116 that are located within a same provider address 128. As another non-limiting example, provider 116 may adjust a service plan, service area, or the like, or hire a person with a specific skill or experience, or any change the provider 116 can make in the provider information 112. Persons skilled in the art, upon reviewing the entirety of this disclosure, may appreciate the various provider landscapes that can be generated.

With continued reference to FIG. 1, in some embodiments, at least a processor 104 may classify user data 136 into one or more user groups. For the purposes of this disclosure, a "user group" is a set of associative user data of a user. In some embodiments, the one or more user groups may be stored in a service database 132. In some embodiments, the one or more user groups may be retrieved from the service database 132. In some embodiments, the user data 136 may be classified into a user address group of one or more user groups. In some embodiments, the user address group may include a plurality of user address groups, where each of the plurality of user address groups includes a specific user address 156. As a non-limiting example, each of the user address groups may include one or more users 120 and their user information 152, where the one or more users 120 includes a user address 156 corresponding to the user address group. For example, and without limitation, when the user address group includes an address of the Empire State Building, a '20 W 34th St., New York, NY 10001' group, the '20 W 34th St., New York, NY 10001' group may include one or more users 120 that includes user address that is related to the address of the Empire State Building and user information 152 of the one or more users 120. The '20 W 34th St., New York, NY 10001' group is merely an example, and the group can be called the Empire State Building group, 44.9064', W073° 59.0735' group, 40.748440, −73.984559 group, and the like.

With continued reference to FIG. 1, in some embodiments, at least a processor 104 may classifier user data 136 into one or more user groups using a user group classifier. The user group classifier disclosed herein may be consistent with a classifier disclosed with respect to FIG. 4. In some embodiments, the user group classifier may be trained with user group training data correlating user data 136 to one or more user groups. The training data disclosed herein is further disclosed with respect to FIG. 4. In some embodiments, user group training data may be stored in a service database 132. In some embodiments, the user group training data may be received from one or more users 120, providers 116, the service database 132, external computing devices, and/or previous iterations of processing. As a non-limiting example, the user group training data may include instructions from a user, who may be an expert user, a past user in embodiments disclosed herein, or the like, which may be stored in memory and/or stored in the service database 132, where the instructions may include labeling of training examples.

With continued reference to FIG. 1, in an embodiment, a user group classifier may be trained with user group training data correlating user data 136 to a user address group of one or more user groups. As a non-limiting example, the user group training data may correlate one or more users 120 and their user information 152 that includes a user address 156 of 10001 zip code to a '20 W 34th St., New York, NY 10001' group. As another non-limiting example, the user group training data may correlate one or more users 120 and their user information 152 that includes a user address 156 of the Empire State Building to the '20 W 34th St., New York, NY 10001' group. As another non-limiting example, the user group training data may correlate one or more users 120 and their user information 152 that includes a user address 156 of the Empire State Building to the '20 W 34th St., New York, NY 10001' group each of the user address groups may include one or more users 120 and their user information 152, where the one or more users 120 includes a user address 156 corresponding to the user address group. For example, and without limitation, when the user address group includes an address of the Empire State Building, a '20 W 34th St., New York, NY 10001' group, the '20 W 34th St., New York, NY 10001' group may include one or more users 120 that includes user address that is related to the address of the Empire State Building and user information 152 of the one or more users 120.

With continued reference to FIG. 1, in some embodiments, at least a processor 104 may be configured to classify user data 136 into one or more user groups using a user group lookup table. For the purposes of this disclosure, a "user group lookup table" is a lookup table that may classify the user data into one or more user groups. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in some embodiments, at least a processor 104 may 'lookup' given user data 136 to find corresponding user groups using a user group lookup table. In an embodiment, the user group lookup table may correlate users 120 to one or more user groups. As a non-limiting example, the user group lookup table may correlate a first user 120 to a first user group. As another non-limiting example, the user group lookup table may correlate a second user 120 to a second user group. In another embodiment, the user group lookup table may correlate user information 152 of users 120 to the one or more user groups. As a non-limiting example, the user group lookup table may correlate a gender of the first user 120 to a first gender group of a first user information group of the first user group. As another non-limiting example, the user group lookup table may correlate a gender of the second user 120 to a second gender group of a first second information group of the second user group. In another embodiment, the user group lookup table may correlate user address 156 of the users 120 to the one or more user groups. As a non-limiting example, the user group lookup table may correlate a user address 156 of the first user 120 to a first gender group of a first user address group of the first user group. As another non-limiting example, the user group lookup table may correlate a user address 156 of the second user 120 to a second gender group of a second address group of the second user group.

With continued reference to FIG. 1, in some embodiments, at least a processor 104 may further generate a user landscape as a function of user data 136. For the purposes of this disclosure, a "user landscape" is an analysis of users using or looking for a service provided by a user. In some embodiments, the user landscape may encompass an analysis all the users 120 and their information (user information 152). As a non-limiting example, the user landscape may include analysis of users 120 and their service request data. As another non-limiting example, the user landscape may include how much do users 120 spend on services, annual income of users 120, annual spending habits of users 120, savings habits of users 120, and the like. In some embodiments, the user landscape may include users 120 within a particular geographic area (user address 156). As a non-limiting example, the user landscape may include analysis of users 120 within the same state, same zip code, same country, or the like. In some embodiments, at least a processor 104 may be configured to generate a user landscape as a function of a user address group of one or more user groups. As a non-limiting example, when the user address group includes a '20 W 34th St., New York, NY 10001' group, where the group includes one or more users 120 that includes user address 156 that is related to the address of the group and user information 152 of the one or more users 120, the at least a processor 104 may analyze the one or more user information 152 of the one or more users 120 to find an average age, profession, education of the one or more users 120, or any information that can be analyzed.

With continued reference to FIG. 1, in some embodiments, at least a processor 104 may further generate a user service token. For the purposes of this disclosure, a "user service token" is a data submission that proves a user's service activity. For the purposes of this disclosure, a "user service activity" is any user's action that the user took for a service provided by a provider. As a non-limiting example, the user service activity may include contacting a provider, getting a consult with a provider, completing a contract with a provider, submitting document to a provider, paying a service cost to a provider, and the like. In some embodiments, the user service token may be given to the user 120 once the user 120 completed the user service activity. In some embodiments, user service token may include physical ticket such as, without limitation, printed document, souvenir, and the like thereof. In other embodiments, user service token may include electronic ticket such as, without limitation, electronic document, email, message, and the like thereof. In a non-limiting example, user service token may include a printed scale ticket at a mill, picture at destination, timecard during the trip, and the like thereof. In some embodiments, the user service token may be used as a payment method. In some embodiments, the user service token may be used as a service discount. In some embodiments, the user service token may be stored in a service database 132. In some embodiments, the user service token may be retrieved from the service database 132. In some embodiments, the user service token may be stored on blockchain, cryptographically, as a digital token, as a hash, and the like.

With continued reference to FIG. 1, in some embodiments, at least a processor 104 may be configured to verify a user 120 or provider 116's credentials (e.g. trust verification). For the purposes of this disclosure, a "trust verification" a process of ensuring that a user or a provider is being "verified" complies with certain constraints. For example without limitation system requirements, regulations, credential, and the like. In some embodiments, the user 120 may check provider 116's credential. In some embodiments, provider 116 may check the user 120's credentials (e.g. trust verification). For the purposes of this disclosure, a "credential" is an attestation of qualification, competence, or authority issued to an individual or organization. As a non-limiting example, the credential may include certificates, licenses, diplomas, degrees, badges, or the like. As another non-limiting example, the trust verification may include checking the credential, conducting background check, verifying the authenticity of the credential through a third-party service, checking work history, reference, and the like.

With continued reference to FIG. 1, in some embodiments, users 120 or providers 116 may have different accessibility to information displayed on a user device 160 or a provider device 148. For the purposes of this disclosure, "accessibility" is ability of an individual or groups to monitor or manage information. In some embodiments, the accessibility may include read-only. In other embodiments, the accessibility may be writable. The writable accessibility may require authentication; for instance, the writable accessibility may be writable only given a password, identifier, key, or other data indicating that the device, users 120 or providers 116 that will be modifying the memory is authorized. For instance, accessibility may include a read-only section. Accessibility may include a writable section with limited access. Accessibility may include a writable section with general access, to which any user may be able to write data. Accessibility may include the read-only section and the generally writable section, or the limited access writable section and the generally writable section, or the read-only section and the limited access section. The limited access section may be limited to users 120 or providers 116, or in other words may be generally writable, but only to users 120 or providers 116, who may have the requisite access codes as a result of joining an apparatus 100 as users 120 or providers 116; the users 120 may alternatively be granted the access codes by the apparatus 100 to update information only when authorized, and otherwise be unable to update the information; in this way, the apparatus 100 may be able to update information accessibility efficiently while maintaining security against misuse of the memory. In some embodiments, preventing users from being able to write over accessibility enables the information to be free from intentional or unintentional corruption or inaccuracy, and enables the apparatus 100 to ensure that certain information is always available to users. In some embodiments, writable sections enable the apparatus 100 itself or users 120 or providers 116 of the apparatus 100 to correct, augment, or update information as described in further detail below.

With continued reference to FIG. 1, in some embodiments, memory 108 may include instructions further configuring at least a processor 104 to obtain one or more documents 162. In some embodiments, the one or more documents 162 may include text, images, tables, charts, graphs, or other elements. In some embodiments, the one or more documents 162 may include various format. As a non-limiting example, the one or more documents 162 may include PDF, DOC, XLS, HTML, PNC, JPEG, BMP, TIFF, MP4, or the like. In an embodiment, one or more documents 162 may include a hard copy form. In another embodiment, one or more documents 162 may include an electronic copy form. In an embodiment, document 162 may include user document as described above. In another embodiment, document 162 may include a service document 186. For the purposes of this disclosure, "service document" is document related to a service provided by a provider. As a non-limiting example, the document 162 may include any documents for legal services, healthcare services, financial services, consulting services, transportation services, educational services, entertainment services, travel services, cleaning services, maintenance services, fitness services, pet care services, real estate services, occupational services, and any services thereof. In some embodiments, provider data 112 may include the service document 186. Persons skilled in the art, upon reviewing the entirety of this disclosure, may appreciate various service documents 186 that can be used for an apparatus 100. In some embodiments, the service document 186 may be stored in a service database 132. In some embodiments, the service document 186 may be retrieved from the service database 132. In another embodiment, the service document 186 may be received from a provider device 148. In some embodiments, the service document 186 may be retrieved from an immutable sequence listing. In some embodiments, the service document 186 may be retrieved from a cloud storage.

With continued reference to FIG. 1, in some embodiments, document 162 may include contract document 188. For the purposes of this disclosure, "contract document" is a document containing legally binding (or legally binding if executed) agreement. In a non-limiting example, the contract document may include sales contract, lease agreement, employment contract, non-disclosure agreement, partnership agreement, joint venture agreement, termination agreement, or any contracts thereof. In some embodiments, provider data 112 may include the contract document 188. In some embodiments, the contract document 188 may be stored in a service database 132. In some embodiments, the contract document 188 may be retrieved from the service database 132. In another embodiment, the contract document 188 may be received from a provider device 148. In some embodiments, the contract document 188 may be retrieved from an immutable sequence listing. In some embodiments, contract document 188 may be retrieved from a cloud storage.

With continued reference to FIG. 1, in some embodiments, memory 108 may include instructions further configuring at least a processor 104 to classify one or more documents 162 into one or more document groups 190. For the purposes of this disclosure, a "document group" is a set of associative documents. In some embodiments, the one or more document groups 190 may be stored in a service database 132. In some embodiments, the one or more document groups 190 may be retrieved from the service database 132. In an embodiment, the one or more document groups 190 may include a user document group. For the purposes of this disclosure, a "user document group" is a set of associative user documents. As a non-limiting example, the user document group may include a financial information document, legal information document, medical information document, employment information document, immigration information document, criminal history document, contract document, lease document, family information document, business information document, intellectual property information document, insurance information document, educational information document group, and the like. The listed user document groups are merely examples and persons with ordinary skills, upon reviewing the entirety of this disclosure, may appreciate various user document groups that can be used for an apparatus 100.

With continued reference to FIG. 1, in another embodiment, one or more document groups 190 may include a service document group. or the purposes of this disclosure, a "service document group" is a set of associative service documents. As a non-limiting example, the service document group may include legal service document, healthcare service document, financial service document, consulting service document, transportation service document, educational service document, entertainment service document, travel service document, cleaning service document, maintenance service document, fitness service document, pet care service document, real estate service document, occupational service document group, or the like. The listed service document groups are merely examples and persons with ordinary skills, upon reviewing the entirety of this disclosure, may appreciate various service document groups that can be used for an apparatus 100. In some embodiments, the service document group may include a sub-group. As a non-limiting example, the sub-group of the legal service document group may include litigation document, transactional service document, estate planning document, intellectual property service document, corporate law service document, immigration service document, and the like. The example above merely shows exemplary sub-groups for the legal service document group, and various sub-groups for other service document groups may be appreciated by persons skilled in the art upon reviewing the entirety of this disclosure.

With continued reference to FIG. 1, in another embodiment, one or more document groups 190 may include contract document groups. or the purposes of this disclosure, a "contract document group" is a set of associative contract documents. As a non-limiting example, the contract document group may include sales contract, lease agreement, employment contract, non-disclosure agreement, partnership agreement, joint venture agreement, termination agreement group, or the like. The listed contract document groups are merely examples and persons with ordinary skills, upon reviewing the entirety of this disclosure, may appreciate various contract document groups that can be used for an apparatus 100.

With continued reference to FIG. 1, in some embodiments, at least a processor 104 may be configured to classify one or more documents 162 into one or more document groups 190 using a document classifier 192. The document classifier 192 disclosed herein may be consistent with a classifier disclosed with respect to FIG. 4. In some embodiments, the document classifier 192 may be trained with document group training data correlating one or more documents 162 to one or more document groups 190. The training data disclosed herein is further disclosed with respect to FIG. 4. In some embodiments, the document group training data may be stored in a service database 132. In some embodiments, the document group training data may be received from one or more users 120, providers 116, the service database 132, external computing devices, and/or previous iterations of processing. As a non-limiting example, the document group training data may include instructions from a user, who may be an expert user, a past user in embodiments disclosed herein, or the like, which may be stored in memory and/or stored in the service database 132, where the instructions may include labeling of training examples.

With continued reference to FIG. 1, in an embodiment, a document classifier 192 may be trained with document group training data correlating user document of one or more documents 162 to a user document group of one or more document groups 190. As a non-limiting example, the document group training data may correlate financial information document of the user document to a financial information document group of the user document group. In another embodiment, the document classifier 192 may be trained with document group training data correlating service document 186 of the one or more documents 162 to a service document group of the one or more document groups 190. As a non-limiting example, the document group training data may correlate immigration service document of legal service document of the service documents 186 to an immigration service document of a legal service document group of the service document group. In another embodiment, the document classifier 192 may be trained with document group training data correlating contract document 188 of the one or more documents 162 to a contract document group of the one or more document groups 190. As a non-limiting example, the document group training data may correlate non-disclosure agreement of the contract document 188 to a non-disclosure agreement group of the contract document group.

With continued reference to FIG. 1, in some embodiments, memory 108 may include instructions further configuring at least a processor 104 to determine one or more user specific documents 194 from one or more document groups 190. For the purposes of this disclosure, "user specific document" is a document that is chosen for a user that has selected a provider or the provider's service. As a non-limiting example, user specific document 194 may include any service documents 186 or contract documents 188 in service document groups or contract document groups of the one or more document groups 190. In some embodiments, the user specific document 194 may be determined from the one or more document groups 190 as match datum is generated by the at least a processor 104. As a non-limiting example, when user 120 chooses provider 116 or the provider 116's service, the at least a processor 104 may generate the match datum, then the at least a processor 104 may determine the user specific document 194. In some embodiments, the at least a processor 104, then, transmit the one or more user specific documents 194 to a user device 160 or a provider device 148 so that the user 120 or the provider 116 can view, add information, review the user specific documents 194.

With continued reference to FIG. 1, in some embodiments, one or more user specific documents 194 may be manually determined by a provider 116. As a non-limiting example, provider 116 may manually determine the one or more user specific documents 194 for a user 120 using a provider device 148. In some embodiments, at least a processor 104 may automatically determine the one or more user specific documents 194 from one or more document groups 190 using a user specific document machine learning model 196. For the purposes of this disclosure, a "user specific document machine learning model" is a machine learning model that determines one or more user specific document from one or more document groups. The user specific document machine learning model disclosed herein may be consistent with a machine learning model disclosed with respect to FIG. 4. The user specific document machine learning model may be trained with user specific document training data. For the purposes of this disclosure, "user specific document training data" is training data that is used to train a user specific document machine learning model. The training data disclosed herein is further disclosed with respect to FIG. 4. In some embodiments, the user specific document training data may be received from a provider 116, a service database 132, external computing devices, and/or previous iterations of processing. As a non-limiting example, the user specific document training data may include instructions from the provider 116, who is an expert personnel, stored in the service database 132, where the instructions may include labeling examples.

With continued reference to FIG. 1, in some embodiments, a user specific document machine learning model 196 may be trained with user specific document training data that correlates one or more user data service keywords to a user specific document 194 from one or more document groups 190. The user data service keyword disclosed herein is further described above. In some embodiments, user specific training data may correlate user data service keywords, user data 136, and/or user responses 174 to one or more user specific documents. As a non-limiting example, the user specific document training data may correlate a 'legal' user data service keyword to the user specific document 194, where the user specific document 194 may be from a legal service document group of a service document group of the one or more document groups 190. As another non-limiting example, the user specific document training data may correlate a 'immigration' user data service keyword to the user specific document 194, where the user specific document 194 may be from an immigration service document group of a legal service document group of a service document group of the one or more document groups 190.

With continued reference to FIG. 1, in some embodiments, at least a processor 104 may be configured to determine the one or more user specific documents 194 from one or more document groups 190 using a user specific document lookup table. For the purposes of this disclosure, a "user specific document lookup table" is a lookup table that may determine the one or more user specific documents from one or more document groups. The user specific document lookup table may be consistent with any lookup table disclosed above. In some embodiments, at least a processor 104 may 'lookup' given using the user specific document lookup table. In an embodiment, the document lookup table may correlate a user data service keyword to the user specific document 194. As a non-limiting example, the user specific document lookup table may correlate a 'legal' user data service keyword to the user specific document 194, where the user specific document 194 may be from a legal service document group of a service document group of the one or more document groups 190. As another non-limiting example, the user specific document lookup table may correlate a 'immigration' user data service keyword to the user specific document 194, where the user specific document 194 may be from an immigration service document group of a legal service document group of a service document group of the one or more document groups 190.

With continued reference to FIG. 1, in some embodiments, one or more user specific documents 194 may include a form field. For the purposes of this disclosure, "form field" is a specific area within a document that is designated for the input of specific types of information. As a non-limiting example, the form field may include text fields, checkboxes, and the like. In an embodiment, a form field may include a signature field. For the purposes of this disclosure, "signature field" is a form field that allows a user or provider to sign a document. In another embodiment, the form field may include an address field. For the purposes of this disclosure, "address field" is a form field that an address of a user or a provider can be put. In another embodiment, the form field may include a name field. For the purposes of this disclosure, "name field" is a form field that a name of a user or a provider can be put. In another embodiment, the form field may include a personal information field. For the purposes of this disclosure, "personal information field" is a form field that personal information of a user or a provider can be put. In another embodiment, the form field may include a time field. For the purposes of this disclosure, "time field" is a form field that the time that a document has been created or proceeded by a user or a provider can be put. In some embodiments, form field may include a contract term field. A contract term field may include, as non-limiting examples, price, time to perform the contract, amount of payments, due date, delivery date, shipment date, conditions precedent, conditions subsequent, and the like. Persons skilled in the art, upon reviewing the entirety of this disclosure, may appreciate various types of form fields that can be used for an apparatus 100. In some embodiments, each of the form fields may include user form field, which user data 136 can be filled in. In some embodiments, each of the form fields may include provider form field, which provider data 112 can be filled in.

With continued reference to FIG. 1, in some embodiments, a provider 116 may generate a form field anywhere in a document (user specific document 194, contract document 188 or service document 186). As a non-limiting example, provider 116 may manually create form field in the document. In another embodiment, at least a processor 104 may automatically create the form field in the document (automatic form field creation system). The automatic form field creation system may convert a non-interactive document into an interactive document with form fields. The automatic form field creation system may include auto field detection that analyzes the structure and content of the document and identifies areas of the document where form fields can be added. In a non-limiting example, when the automatic form field creation system identifies potential form fields, the provider 116 can then review the identified form fields and choose which ones to add as form fields in the document, or revise, add, delete the form fields in the document. In a non-limiting example, the automatic form field creation system may be implemented using Adobe Acrobat DC, Adobe Acrobat Reader DC, JotForm, Type Form, Google Forms, Wufoo, Formstack, or the like.

With continued reference to FIG. 1, in some embodiments, one or more user specific documents 194 may include user specific contract documents. For the purposes of this disclosure, "user specific contract document" is contract document that is chosen for a user that has selected a provider or the provider's service. As a non-limiting example, the user specific contract document may include any contract document 188 described above. In a non-limiting example, when a user 120 chooses a provider 116 or the provider 116's service, the at least a processor 104 may generate match datum, then the at least a processor 104 may determine the user specific contract document. In some embodiments, the user specific contract document may include a form field. As a non-limiting example, the user specific contract document may include a signature field. As another non-limiting example, the user specific contract document may include a name field, time field, address field, and the like. In some embodiments, once the form field of the user specific contract document is filled, the at least a processor 104 may generate a contract completion datum. For the purposes of this disclosure, "contract completion datum" is datum that indicates that all form field of a user specific contract document is filled. In another embodiment, the at least a processor 104 may generate the contract completion datum when the user 120 pays a service cost to the provider 116. In some embodiments, once the at least a processor 104 receives the contract completion datum, the at least a processor 104 may generate a service alert 182 as described below.

With continued reference to FIG. 1, in some embodiments, one or more user specific documents 194 may include user specific service documents. For the purposes of this disclosure, "user specific service document" is a service document that is chosen for a user. As a non-limiting example, the user specific service document may include any service document 186 described above. In some embodiments, at least a processor 104 may transmit the user specific service document to a user 120 or user device 160 when the at least a processor 104 receives contract completion datum. In some embodiments, at least a processor 104 may not transmit the user specific service document to the user 120 or the user device 160 when the at least a processor 104 does not receive the contract completion datum. As a non-limiting example, at least a processor 104 may not determine and transmit the user specific service document to the user 120 or user device 160 if the user 120 does not sign a user specific contract document. As another non-limiting example, the at least a processor 104 may not determine and transmit the user specific service document to the user 120 or user device 160 if the user 120 does not pay the provider 116. In some embodiments, the user specific service document may include a form field. As a non-limiting example, the user specific contract document may include a name field, time field, address field, signature field, and the like. In some embodiments, once the form field of the user specific service document is filled, the at least a processor 104 may generate a contract completion datum. For the purposes of this disclosure, "service document completion datum" is datum that indicates that all form field of a user specific service document is filled. In some embodiments, once the at least a processor 104 receives the contract completion datum, the at least a processor 104 may generate a service alert 182 as described below.

With continued reference to FIG. 1, in some embodiments, memory 108 may include instructions configuring at least a processor 104 to generate a filled user specific document 184. For the purposes of this disclosure, a "filled user specific document" is a user specific document that has each of its form fields filled with information. In some embodiments, the form field of one or more user specific document 194 may be filled with user data 136, provider data 112, or the like as described below. In an embodiment, the form field of the one or more user specific documents 194 may be manually filled. As a non-limiting example, the form field may be manually filled with a user field input response of a user response 174. As another non-limiting example, the form field may be manually filled with a provider field input response of a provider response. In another embodiment, the form field of the one or more user specific documents 194 may be automatically filled. As a non-limiting example, at least a processor 104 may automatically fill the form field with user data 136. As another non-limiting example, at least a processor 104 may automatically fill the form field with provider data 112. In some embodiments, the user data 136 and the provider data 112 disclosed herein may be retrieved from a service database 132. In some embodiments, the user data 136 and the provider data 112 disclosed herein may be retrieved from any other system or storage as described in the entirety of this disclosure. In some embodiments, the at least a processor 104, then, transmit the one or more filled user specific documents 184 to a user device 160 or a provider device 148 so that the user 120 or the provider 116 can view, add information, review the one or more filled user specific documents 184.

With continued reference to FIG. 1, in some embodiments, at least a processor 104 may automatically fill a form field of one or more user specific document 194 using a form field machine learning model 198. For the purposes of this disclosure, a "form field machine learning model" is a machine learning model that fills a form field of a user specific document. The form field machine learning model 198 disclosed herein may be consistent with a machine learning model disclosed with respect to FIG. 4. The form field machine learning model 198 may be trained with form field training data. For the purposes of this disclosure, "form field training data" is training data that is used to train a form field machine learning model 198. The training data disclosed herein is further disclosed with respect to FIG. 4. In some embodiments, the form field training data may be received from a user 120 or provider 116, a service database 132, external computing devices, and/or previous iterations of processing. As a non-limiting example, the form field training data may include instructions from the user 120 or provider 116 stored in the service database 132, where the instructions may include labeling examples. In some embodiments, the form field machine learning model 198 may be implemented with data mapping process. For the purposes of this disclosure, "data mapping" is the process of defining the relationships between data elements in different entities. In some embodiments, data mapping may include mapping fields, defining the data types and formats to be used, and identifying any transformations or conversions that are necessary.

With continued reference to FIG. 1, in some embodiments, a form field machine learning model 198 may be trained with form field training data that correlates user data 136 to a form field of one or more user specific documents 194. As a non-limiting example, the form field training data may correlate a user's name of user information 152 to a name field of the form field, which is a user form field. In some embodiments, the form field machine learning model 198 may be trained with the form field training data that correlates provider data 112 to the form field of the one or more user specific document 194. As a non-limiting example, the form field training data may correlate a provider 116's name of provider information 128 to a name field of the form field, which is a provider form field.

With continued reference to FIG. 1, in some embodiments, at least a processor 104 may fill a form field of one or more user specific documents 194 using a form field lookup table. The form field lookup table disclosed herein may be consistent with a lookup table disclosed above. In some embodiments, the at least a processor 104 may 'lookup' user data 136 to find a corresponding form field of one or more user specific documents 194 using the form field lookup table. As a non-limiting example, the form field lookup table may correlate a user's name of user information 152 to a name field of the form field, which is a user form field. In some embodiments, at least a processor 104 may 'lookup' provider data 112 to find a corresponding form field of the one or more user specific document 194 using the form field lookup table. As a non-limiting example, the form field lookup table may correlate a provider 116's name of provider information 128 to a name field of the form field, which is a provider form field.

With continued reference to FIG. 1, in some embodiments, at least a processor 104 may be configured for data verification. For the purposes of this disclosure, a "data verification" is a process of ensuring that any information submitted by a user or a provider is being "verified" complies with certain constraints. In some cases, the data verification may include ensuring that data is complete, for example that all required data types are present, readable, uncorrupted, and/or otherwise useful for processor 104. In some cases, some or all verification processes may be performed by processor 104. In some cases, at least a machine-learning process, for example a machine-learning model, may be used to verify. Processor 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation. In some embodiments, the data verification may include data cleaning. For the purposes of this disclosure, "data cleaning" is the process of identifying and correcting or removing errors and inconsistencies in data. In some embodiments, data cleaning may include analyzing user data 136 or provider data 112 to identify any missing or incomplete values, outliers, or inconsistencies. As a non-limiting example, at least a processor 104 may include predefined validation rules that check for common data errors or inconsistencies, such as formatting errors, invalid values, or out-of-range values. As another non-limiting example, the at least a processor 104 may include statistical analysis that may detect outliers, unusual patterns or trends, or inconsistencies in the data. In some cases, at least a processor 104 may flag the missing data and prompt a user 120 or a provider 116 to input the necessary information. In some embodiments, at least a processor 104 may generate a service alert 182 for the inconsistency, invalid values, out-of-range values, or the like. In other cases, at least a processor 104 may infer the missing data based on other available information or use statistical techniques to estimate the missing values. As a non-limiting example, the statistical techniques may include mean imputation, regression imputations, k-nearest neighbor imputation, expectation-maximization (EM) algorithm, or the like. In some cases, the at least a processor 104 may exclude the data with missing values from analysis altogether to generate a user activity report 128. In some embodiments, data cleaning may include removing duplicates, correcting spelling mistakes and formatting the user data 136 or provider data 112 in a consistent manner. In some embodiments, data cleaning may include checking the user data 136 or provider data 112 for accuracy and consistency, such as checking that all values fall within a specified range. In some embodiments, an apparatus 100 may interface with an API. As a non-limiting example, the API may include third-party customer relationship management (CRM) platforms. For example, and without limitation, the third-party CRM platforms may include Action step, Salesforce, Microsoft Dynamics 365, or the like.

With continued reference to FIG. 1, in some embodiments, at least a processor 104 may be configured to generate a service alert 182. For the purposes of this disclosure, a "service alert" is an indication to inform a user or provider about a service, user service activity, user response or provider response. In some embodiments, the at least a processor 104 may provide the service alert 182 to the user 120 or provider 116 on a user device 160 or provider device 148. In some embodiments, the service alert 182 may include audio, text, image, vibration, and the like. In some embodiments, the service alert 182 may include a text message, notification sound, phone call, notification banner, or the like. In some embodiments, the service alert 182 may include a reminder. For the purposes of this disclosure, a "reminder" is a notification for prompting a user or provider to remember something. As a non-limiting example, the reminder may include prompting the user 120 to complete filling a user specific document 194. As another non-limiting example, the reminder may include prompting provider 116 to review the user specific document 194. As another non-limiting example, the reminder may include prompting provider 116 to contact the user 120 for a follow-up. In some embodiments, at least a processor 104 may be configured to generate a service alert 182 as a function of match datum. As a non-limiting example, at least a processor 104 may generate the service alert 182 when the match datum is generated. In some embodiments, the service alert 182 may inform the user 120 or provider 116 to contact the user 120 or the provider 116. In some embodiments, the service alert 182 may inform the user 120 or provider 116 that there is missing document or incomplete document. Other examples of generating the service alert 182 are disclosed above.

With continued reference to FIG. 1, in some embodiments, at least a processor 104 may be configured to generate a self-executing record, also referred to as a smart contract in this disclosure, as a function of match datum. In some embodiments, the self-executing record may include authorized access to information through a user interface. "Authorized Access," as used herein, is the act of releasing confidential information to authorized users or providers. A "self-executing record," as used in this disclosure, is an algorithm, data structure, and/or a transaction protocol which automatically executes, controls, documents, and/or records legally relevant events and actions according to the terms of a contract or an agreement and assign ownership and manage the transferability of information. Objectives of smart contracts may include reduction of need in trusted intermediators, arbitrations and enforcement costs, fraud losses, as well as the reduction of malicious and accidental exceptions. Smart contracts may permit trusted transactions and agreements to be carried out among disparate, anonymous parties without the need for a central authority, legal system, or external enforcement mechanism. In a non-limiting embodiment, processor 104 may execute a smart contract to deploy at least an element of data from a user 120 or a provider 116 into immutable sequential listing. A smart contract may be configured to conform to various standards, such as ERC-721. A smart contract standard may provide functionalities for smart contracts. As a further non-limiting example, a smart contract can contain and/or include in postings representations of one or more agreed upon actions and/or transactions to be performed. A smart contract may contain and/or include payments to be performed, including "locked" payments that are automatically released to an address of a party upon performance of terms of contract. A smart contract may contain and/or include in postings representations of items to be transferred, including without limitation NFTs or crypto currencies. Persons skilled in the art, upon reviewing the entirety of this disclosure, will be aware of the various embodiments and implementation of a smart contract for purposes as described herein.

With continued reference to FIG. 1, in some embodiments, at least a processor 104 may authenticate a user 120 or a provider 116 using an authentication module. Authentication module may include any suitable software and/or hardware as described in the entirety of this disclosure. Authentication module may include a login portal for users 120 or providers 116 to submit authentication credentials. Authentication module and/or at least a processor 104 may be configured to receive the authentication credential associated with users 120 or providers 116 from a user device 160 or provider device 148, compare the authentication credential to an authorized authentication credential stored within an authentication database, and bypass authentication for provider device 148 and/or user device 148 based on the comparison of the authentication credential from provider device 148 and/or user device 148 to the authorized authentication credential stored within the service database 132. A "authentication credential" as described in the entirety of this disclosure, is a datum representing an identity, attribute, code, and/or characteristic specific to a user or a provider and/or user device or provider device. For example, and without limitation, the authentication credential may include a username and password unique to user 120 or a provider 116 and/or user device 160 or provider device 148. The username and password may include any alpha-numeric character, letter case, and/or special character. As a further example and without limitation, the authentication credential may include a digital certificate, such as a public key infrastructure (PKI) certificate.

With continued reference to FIG. in a non-limiting embodiment, authentication module may manipulate any information of the entirety of this disclosure to be displayed to a user with varying authority or accessibility as described above. Authentication module may incorporate priority classifiers used to classify low, average, and high classification of authorized users 120 and/or providers 116. Users 120 or providers 116 with lower priority classifications detected by authentication module may allow a limited amount of information (limited accessibility) to be displayed to a user device 160 or a provider device 148 for viewing by the users 120 or providers 116 with lower priority classification. In a non-limiting embodiment, authentication module may detect users 120 or providers 116 with high priority classifications and transmit a robust information with full accessibility. Persons of ordinary skill in the art, after viewing the entirety of this disclosure, would appreciate the various amount of information allowed to be viewed for different levels of authority. In a non-limiting embodiment, authentication module may be used as a security measure for information. A person of ordinary skill in the art, after viewing the entirety of this disclosure, would appreciate the function of an authentication module in the context of secure data exchange.

Figure 2:
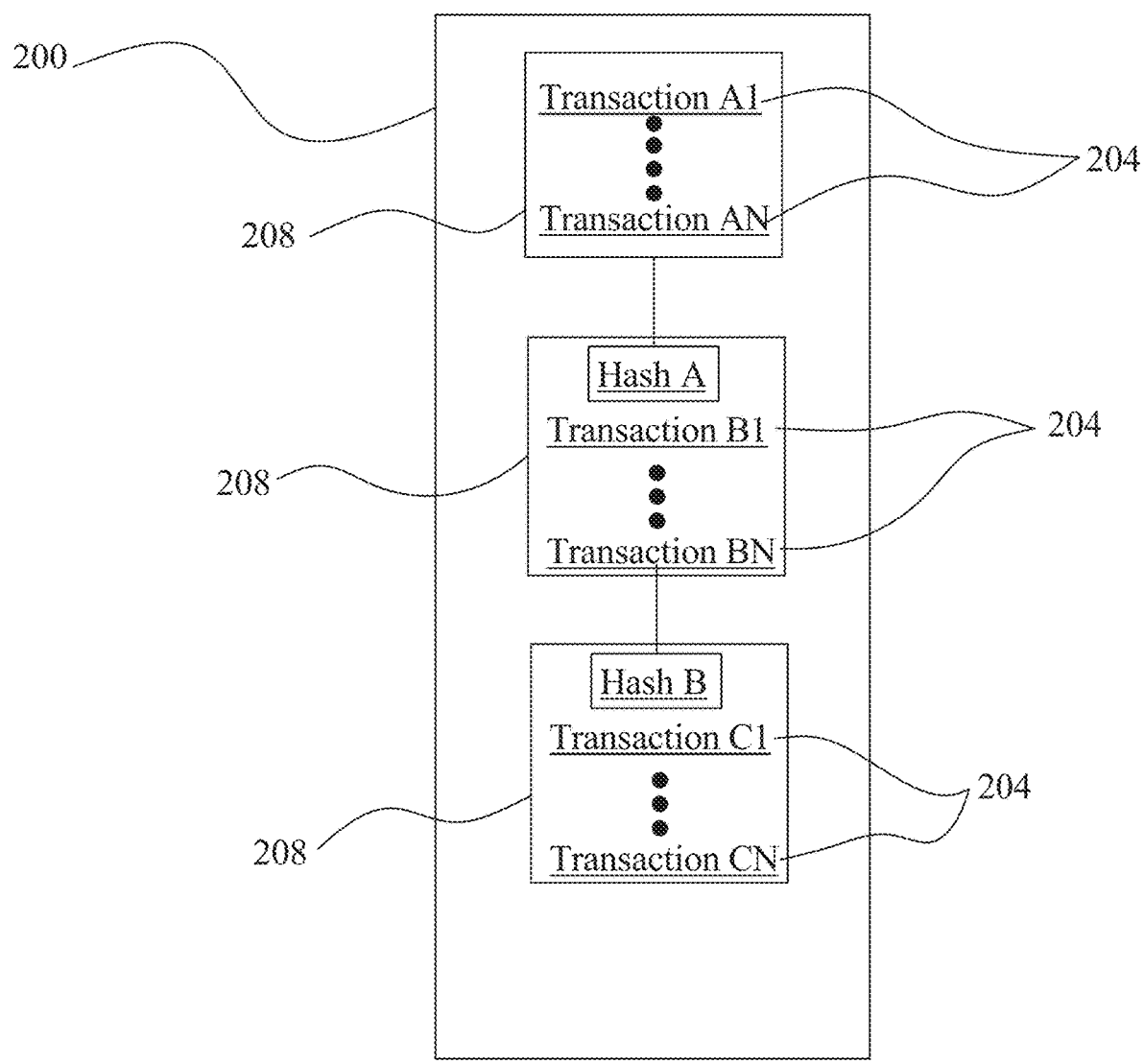
FIG. 2 an exemplary embodiment of an immutable sequential listing.

Referring now to FIG. 2, an exemplary embodiment of an immutable sequential listing 200 is illustrated. An immutable sequential listing may be, include and/or implement an immutable ledger, where data entries that have been posted to the immutable sequential listing cannot be altered. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
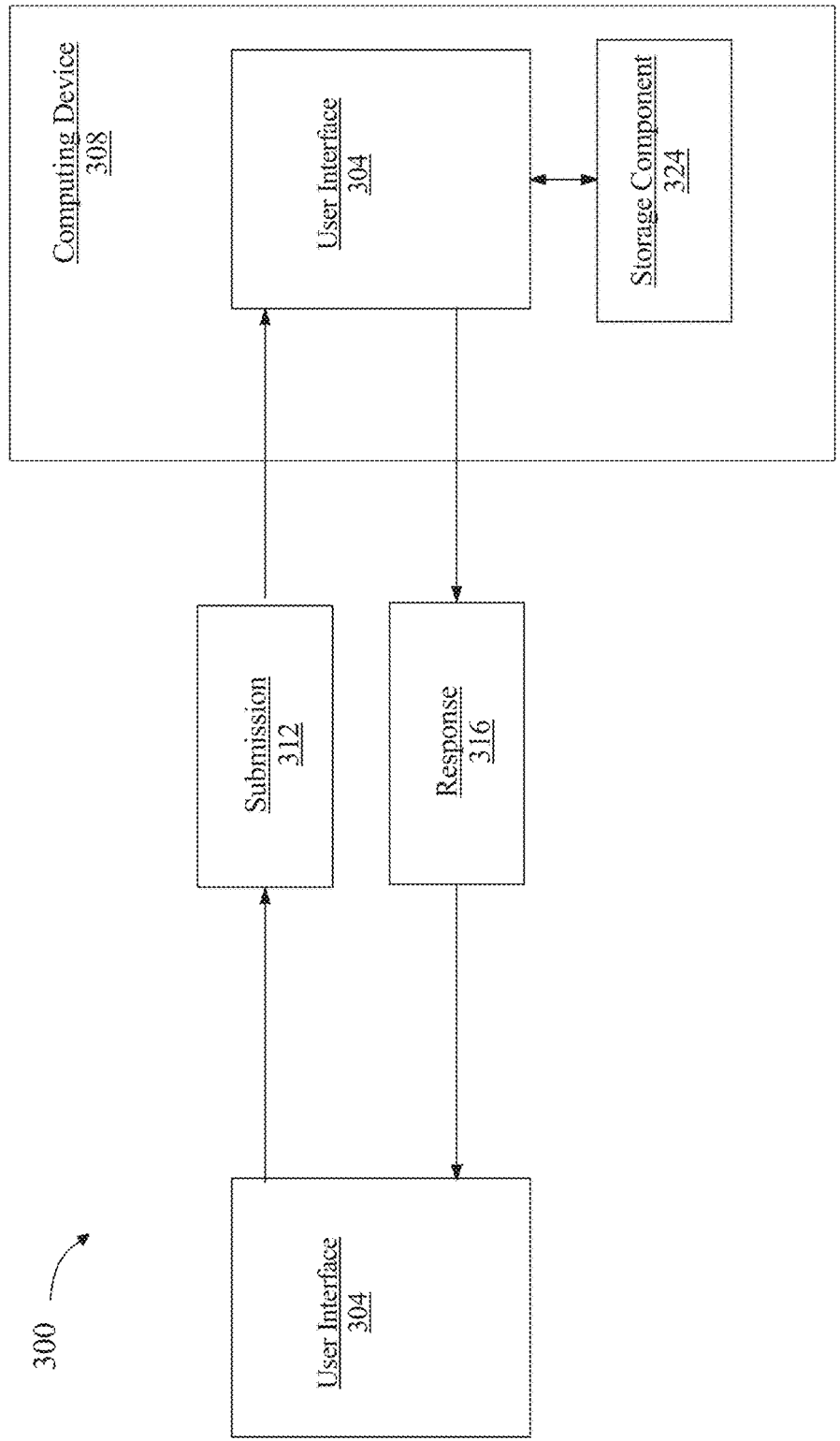
FIG. 3 is a block diagram of a chatbot system.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with provider device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 3112 using one or more of keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a provider device 304 may be used by computing device 308 as an input to another function.

With continued reference to FIG. 3, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a user or provider inputs in to a chatbot as a response to a prompt or question.

With continuing reference to FIG. 3, computing device 308 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a user input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 308 may generate two or more decision trees, which may overlap; for instance, a root node of one tree may connect to and/or receive output from one or more terminal nodes of another tree, intermediate nodes of one tree may be shared with another tree, or the like.

Still referring to FIG. 3, computing device 308 may build decision tree by following relational identification; for example, relational indication may specify that a first rule module receives an input from at least a second rule module and generates an output to at least a third rule module, and so forth, which may indicate to computing device 308 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 308 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/ or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 4:
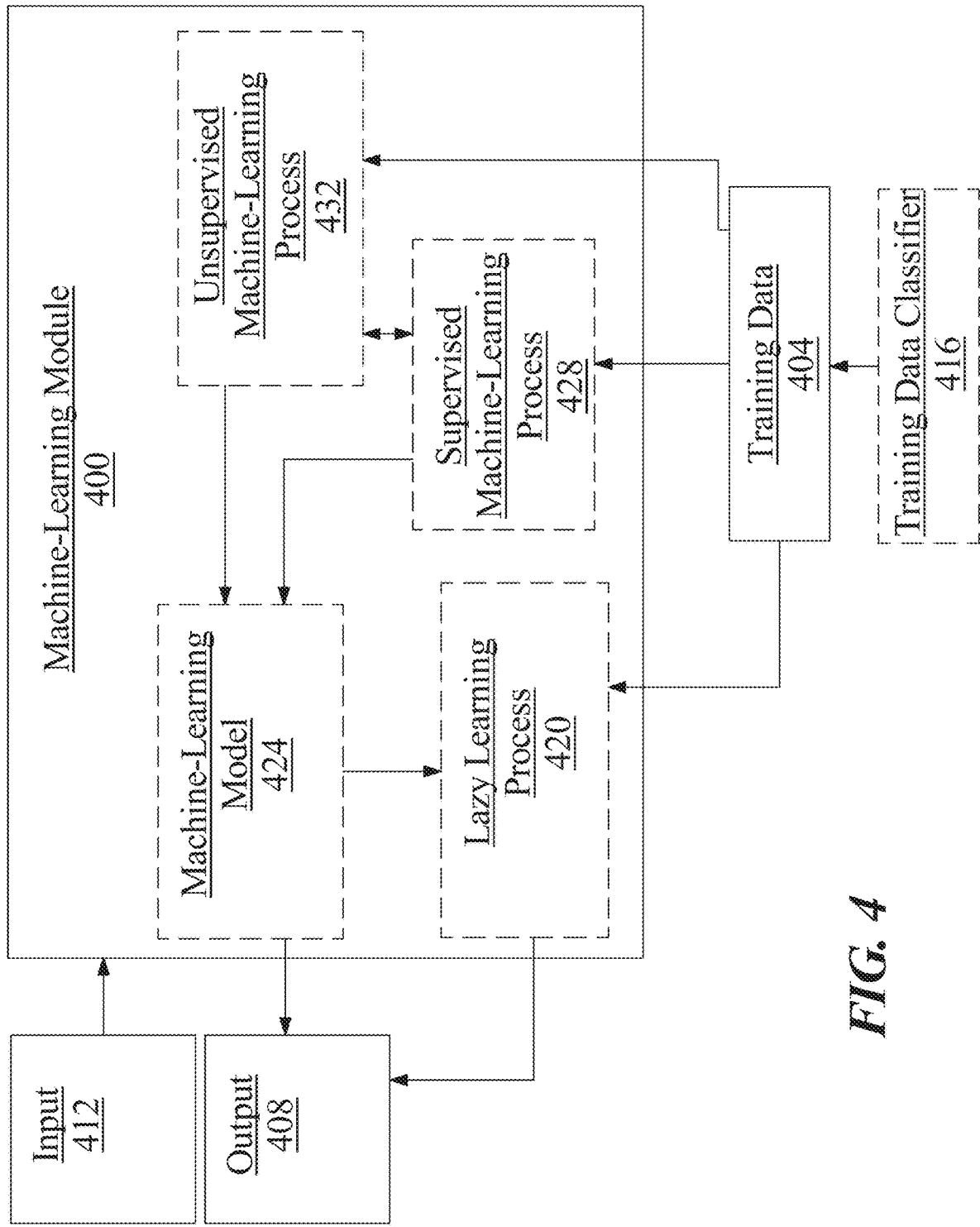
FIG. 4 is a block diagram of an exemplary embodiment of a machine learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include customer financial data 116 and calculation metrics 124 correlated to risk data 120.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to Medicaid requirements 204.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include customer assets and projected nursing home costs as described above as inputs, rate of asset depletion as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
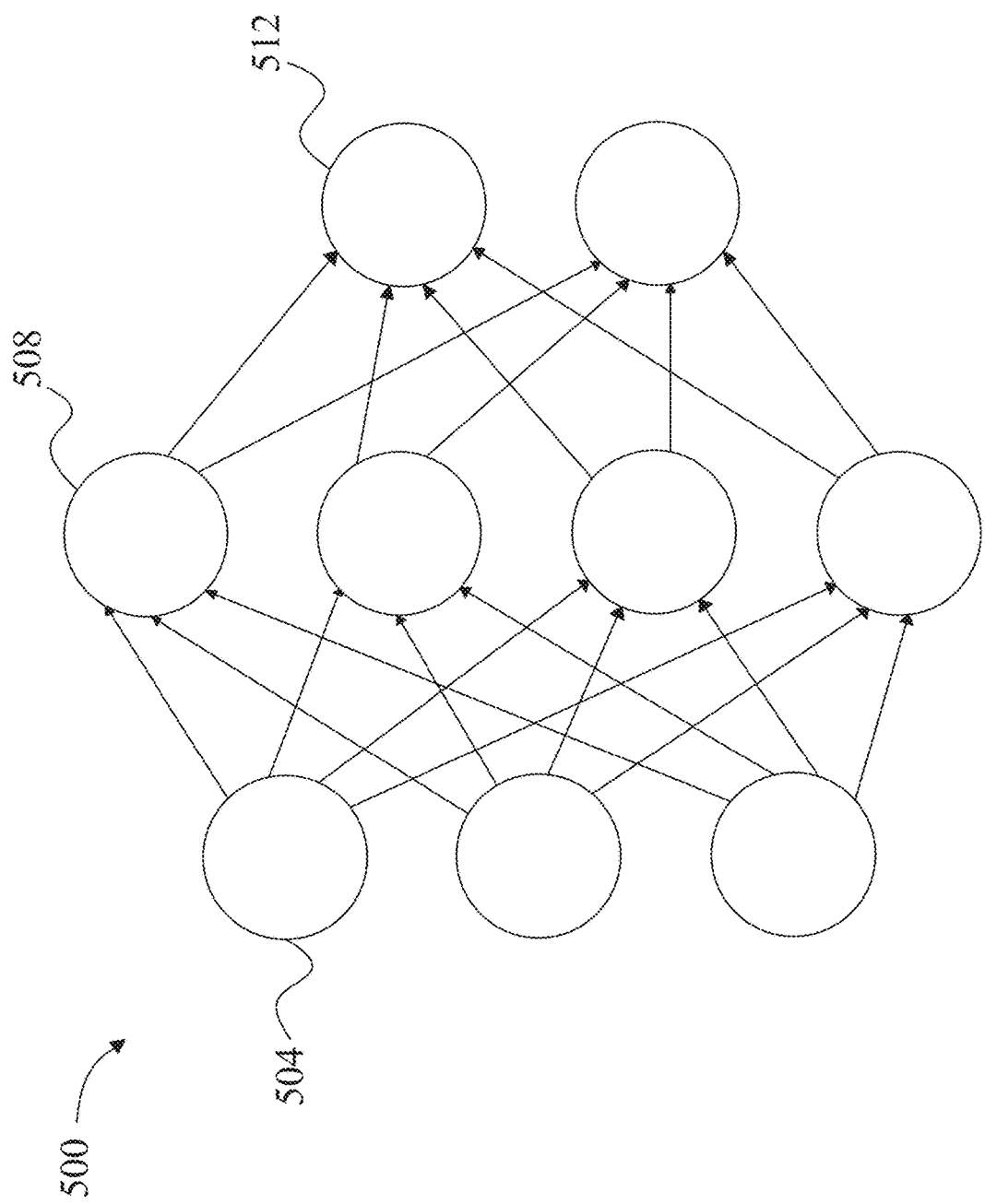
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
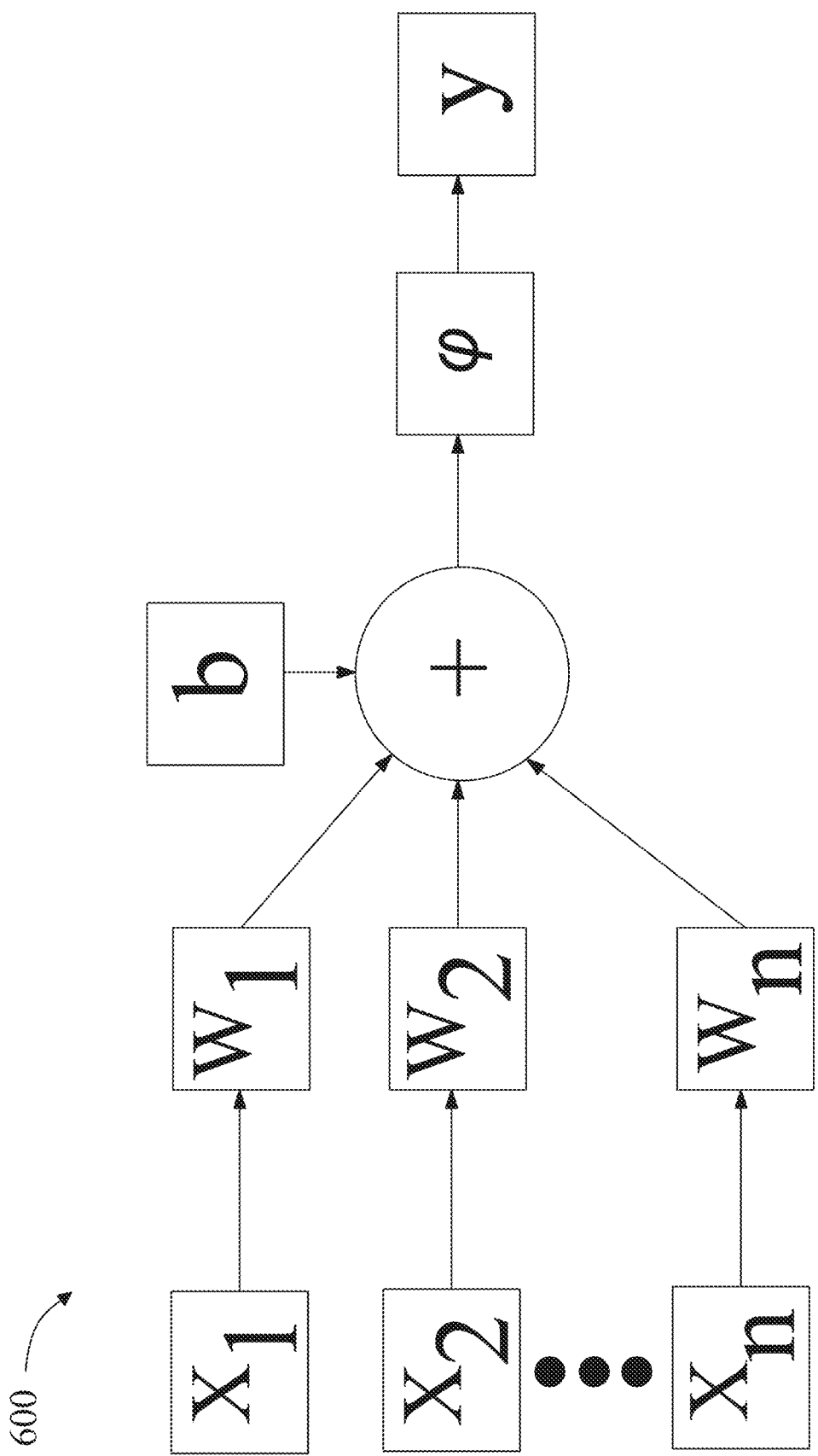
FIG. 6 is a diagram of an illustrative embodiment of a node of a neural network.

Referring now to FIG. 6, an exemplary embodiment of a node 600 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
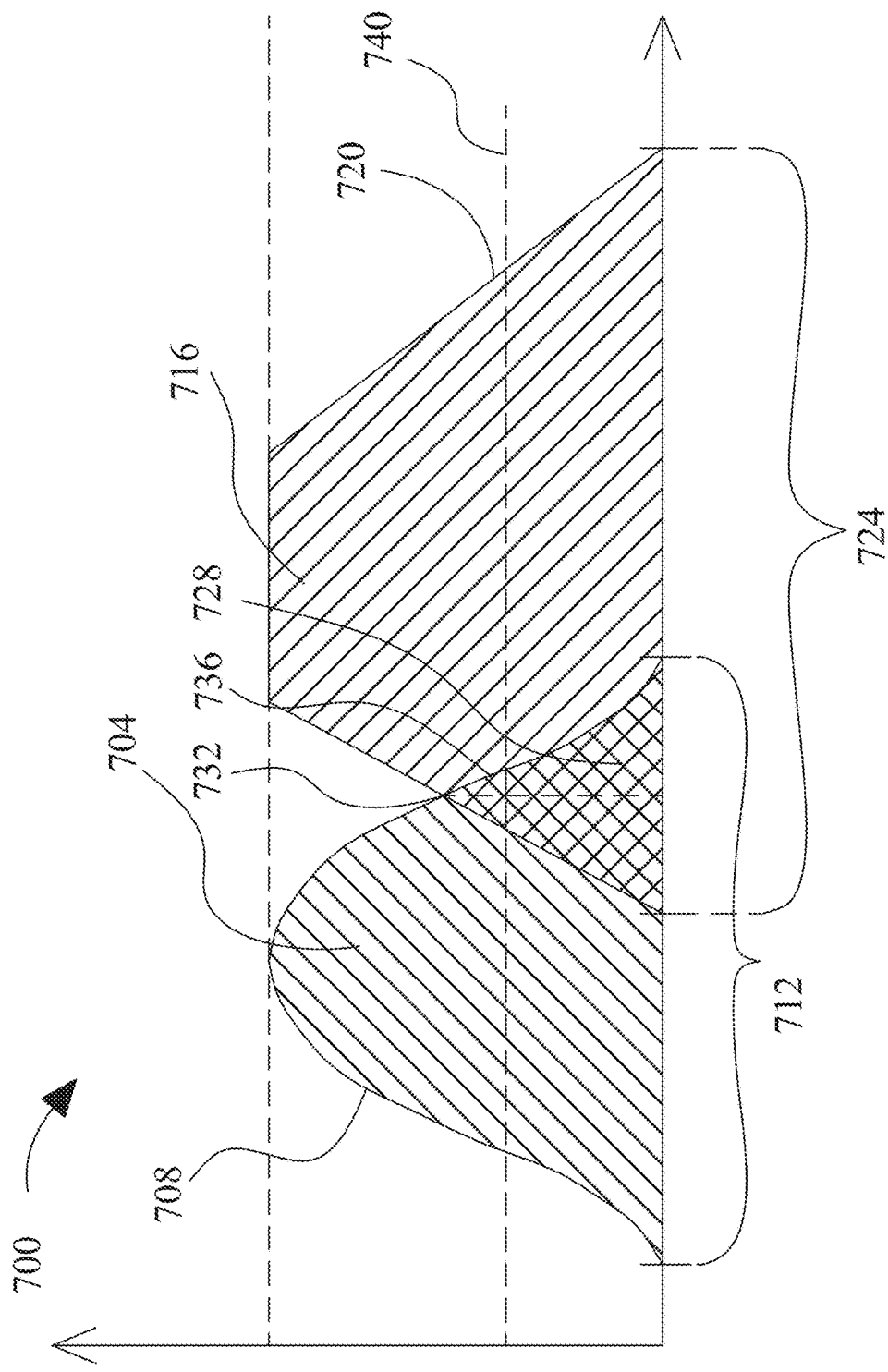
FIG. 7 is a graph illustrating an exemplary relationship between fuzzy sets.

Referring now to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more machine-learning models. A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models. Alternatively or additionally, each threshold may be tuned by a machine-learning and/or statistical process, for instance and without limitation as described in further detail below.

Figure 8:
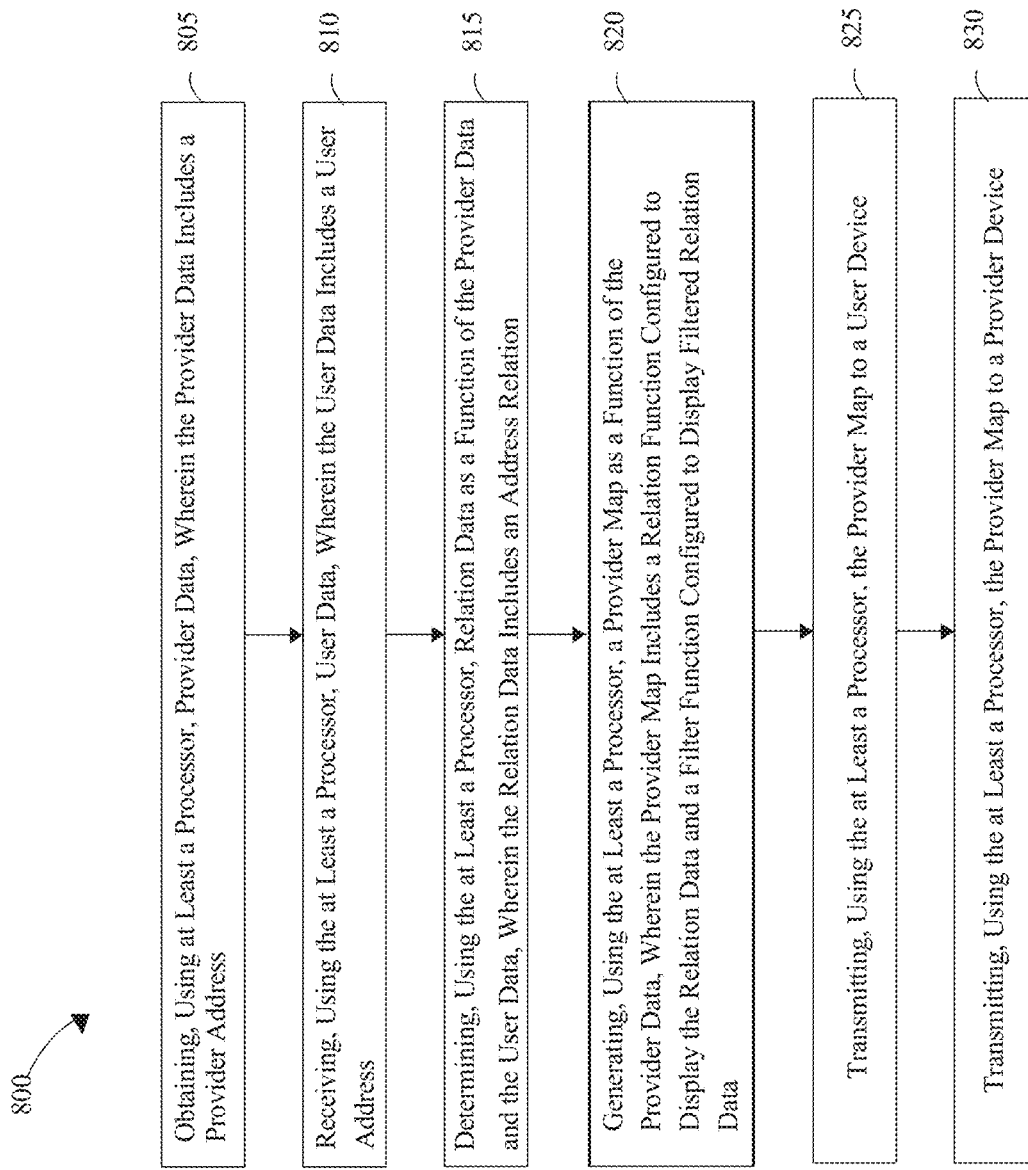
FIG. 8 is a flow diagram of an exemplary method for online service providing.

Referring now to FIG. 8, a flow diagram of an exemplary method 800 for online service providing is illustrated. The method 800 includes a step 805 of obtaining, using at least a processor, provider data, wherein the provider data includes a provider address. These may be implemented as disclosed with respect to FIGS. 1-7.

With continued reference to FIG. 8, a method 800 includes a step 810 of receiving, using at least a processor, user data, wherein the user data includes a user address. In some embodiments, the user data may further include user information, wherein the user information may include service request data. In some embodiments, the method 800 may further include receiving, using the at least a processor, the user data from a chatbot. These may be implemented as disclosed with respect to FIGS. 1-7.

With continued reference to FIG. 8, Method 800 includes a step 815 of determining, using at least a processor, relation data as a function of the provider data and the user data, wherein the relation data includes an address relation. In some embodiments, the method 800 may further include generating, using at least a processor, an information relation of the relation data as a function of the provider information and the user information. These may be implemented as disclosed with respect to FIGS. 1-7.

With continued reference to FIG. 8, a method 800 includes a step 820 of generating, using at least a processor, a provider map as a function of provider data, wherein the provider map comprises a relation function configured to display relation data and a filter function configured to display filtered relation data. In some embodiments, the provider data may further include provider information. In some embodiments, the method 800 may further include generating, using the at least a processor, the relation function as a function of an information relation of the relation data. In some embodiments, the method 800 may further include determining, using the at least a processor, a relation score for the relation data and generating, using the at least a processor, the provider map as a function of the relation score. In some embodiments, the method 800 may further include generating, using the at least a processor, a provider landscape as a function of the relation score. In some embodiments, the method 800 may further include receiving, using the at least a processor, a user response from the user device and generating the filter function as a function of the user response. In some embodiments, the provider map may further include a comparison function, wherein the comparison function is configured to display a comparison of the relation data. These may be implemented as disclosed with respect to FIGS. 1-7.

With continued reference to FIG. 8, a method 800 includes a step 825 of transmitting, using at least a processor, a provider map to a user device. These may be implemented as disclosed with respect to FIGS. 1-7.

With continued reference to FIG. 8, a method 800 includes a step 830 of transmitting, using at least a processor, a provider map to a provider device. These may be implemented as disclosed with respect to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
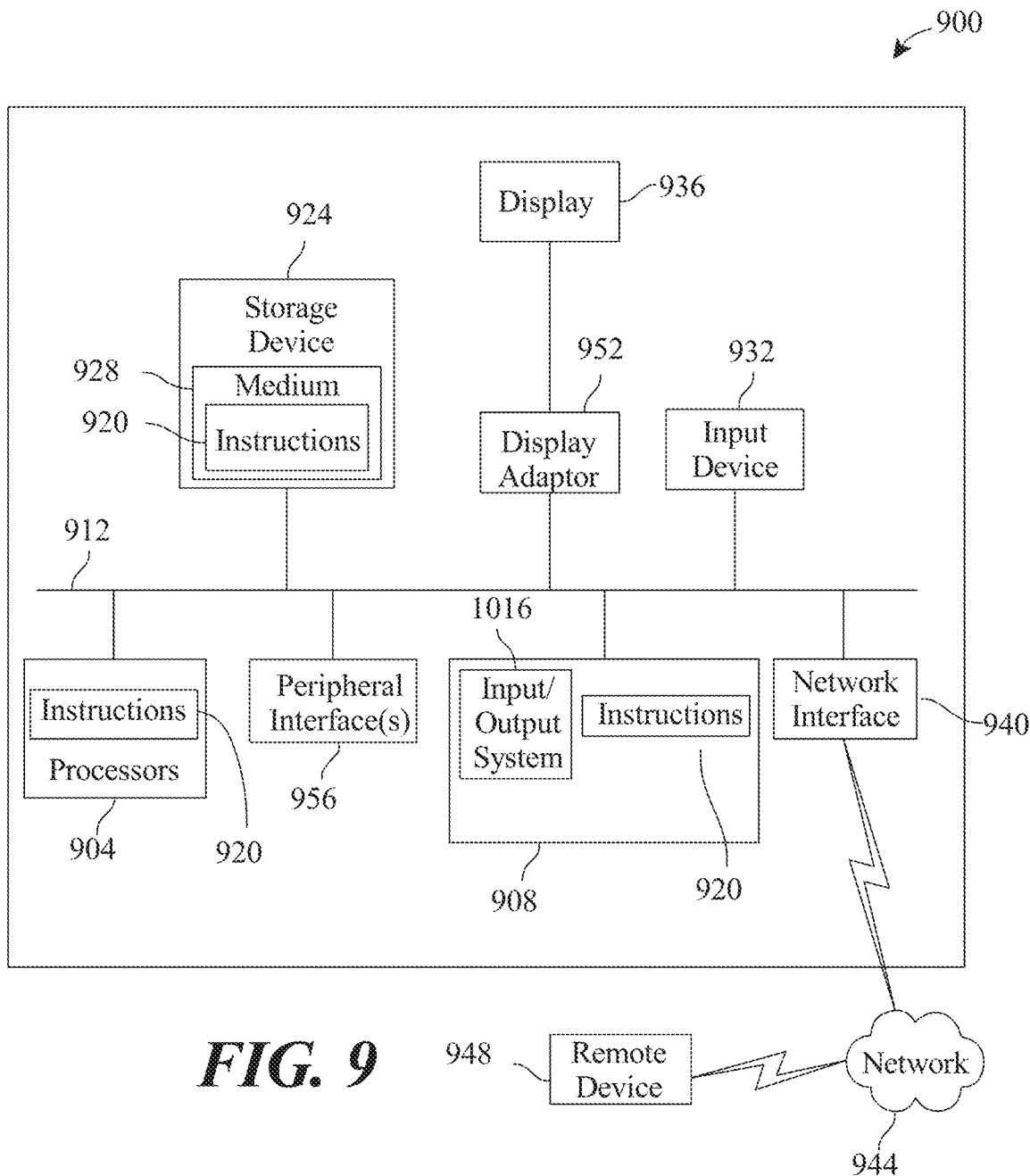
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956.

Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for online service providing, the apparatus comprising:
    at least a processor; and
    a memory communicatively connected to the at least a processor, wherein the memory contains instructions configuring the at least a processor to:
        obtain provider data associated with at least one service provider, wherein the provider data comprises a provider address;
        receive user data for a user, wherein the user data comprises a user address;
        determine relation data as a function of identifying at least one common data between the provider data and the user data, wherein the relation data comprises an address relation;
        determine a relation score for the relation data as a function of a quantity of the common data between the provider data and the user data:
        generate a provider map as a function of the provider data, wherein the provider map comprises:
            a relation function, wherein the relation function is configured to display the relation data and comprises a ranked list of the at least one service provider as a function of the relation score; and
            a filter function, wherein the filter function is configured to display filtered relation data;
        select a provider as a function of the provider map;
        generate a user service token as a function of the selection;
        generate a service discount datum as a function of the user service token; and
        transmit the provider map, service discount and the user service token to a provider device and a user device.

2. The apparatus of claim 1, wherein the provider data further comprises provider information.

3. The apparatus of claim 1, wherein the user data further comprises user information, wherein the user information comprises service request data.

4. The apparatus of claim 3, wherein:
    the relation data further comprises an information relation; and
    the memory contains the instructions further configuring the at least a processor to generate the information relation as a function of the provider data and the user information.

5. The apparatus of claim 4, wherein the memory contains the instructions further configuring the at least a processor to generate the relation function as a function of the information relation.

6. The apparatus of claim 1, wherein the memory contains the instructions further configuring the at least a processor to:
    determine a relation score for the relation data; and
    generate the provider map as a function of the relation score.

7. The apparatus of claim 6, wherein the memory contains the instructions further configuring the at least a processor to generate a provider landscape as a function of the relation score.

8. The apparatus of claim 1, wherein the memory contains the instructions further configuring the at least a processor to:
    receive a user response from the user device; and
    generate the filter function of the provider map as a function of the user response.

9. The apparatus of claim 1, wherein the memory contains the instructions further configuring the at least a processor to receive the user data from a chatbot.

10. The apparatus of claim 1, wherein the provider map further comprises a comparison function, wherein the comparison function is configured to display a comparison of the relation data.

11. A method for online service providing, the method comprising:
    obtaining, using at least a processor, provider data associated with at least one service provider, wherein the provider data comprises a provider address;
    receiving, using the at least a processor, user data for a user, wherein the user data comprises a user address;
    determining, using the at least a processor, relation data as a function of identifying at least one common data between the provider data and the user data, wherein the relation data comprises an address relation;
    determining, using the at least a processor, a relation score for the relation data as a function of a quantity of the common data between the provider data and the user data;
    generating, using the at least a processor, a provider map as a function of the provider data, wherein the provider map comprises:
        a relation function, wherein the relation function is configured to display the relation data and comprises a ranked list of the at least one service provider as a function of the relation score; and
        a filter function, wherein the relation function is configured to display filtered relation data;
    selecting, using the at least a processor, a provider as a function of the provider map;
    generating, using the at least a processor, a user service token as a function of the selection;
    generating, using the at least a processor, a service discount datum as a function of the user service token; and transmitting, using the at least a processor, the provider map, the service discount datum and the user service token to a provider device and a user device.

12. The method of claim 11, wherein the provider data further comprises provider information.

13. The method of claim 11, wherein the user data further comprises user information, wherein the user information comprises service request data.

14. The method of claim 13, further comprising:
generating, using the at least a processor, an information relation as a function of the provider data and the user information.

15. The method of claim 14, further comprising:
generating, using the at least a processor, the relation function as a function of the information relation.

16. The method of claim 11, further comprising:
determining, using the at least a processor, a relation score for the relation data; and
generating, using the at least a processor, the provider map as a function of the relation score.

17. The method of claim 16, further comprising:
generating, using the at least a processor, a provider landscape as a function of the relation score.

18. The method of claim 11, further comprising:
receiving, using the at least a processor, a user response from the user device; and
generating, using the at least a processor, the filter function of the provider map as a function of the user response.

19. The method of claim 11, further comprising:
receiving, using the at least a processor, the user data from a chatbot.

20. The method of claim 11, wherein the provider map further comprises a comparison function, wherein the comparison function is configured to display a comparison of the relation data.

* * * * *